US010879957B2

(12) United States Patent
Gilbert

(10) Patent No.: US 10,879,957 B2
(45) Date of Patent: Dec. 29, 2020

(54) DEVICE, SYSTEM AND METHOD FOR SELECTIVELY RECEIVING DATA BROADCAST IN A NETWORK

(71) Applicant: ERGYLINK, Levallois Perret (FR)

(72) Inventor: Jerome Gilbert, Levallois Perret (FR)

(73) Assignee: ERGYLINK, Levallois Perret (FR)

( * ) Notice: Subject to any disclaimer, the term of this patent is extended or adjusted under 35 U.S.C. 154(b) by 16 days.

(21) Appl. No.: 16/314,023

(22) PCT Filed: Jun. 7, 2017

(86) PCT No.: PCT/IB2017/053359
§ 371 (c)(1),
(2) Date: Dec. 28, 2018

(87) PCT Pub. No.: WO2018/002746
PCT Pub. Date: Jan. 4, 2018

(65) Prior Publication Data
US 2020/0186194 A1 Jun. 11, 2020

(30) Foreign Application Priority Data

Jun. 28, 2016 (FR) ...................... 16 01021

(51) Int. Cl.
*H04B 3/54* (2006.01)
*H04B 3/56* (2006.01)

(52) U.S. Cl.
CPC .............. *H04B 3/542* (2013.01); *H04B 3/56* (2013.01); *H04B 2203/5433* (2013.01); *H04B 2203/5441* (2013.01); *H04B 2203/5445* (2013.01)

(58) Field of Classification Search
CPC . H04B 3/54; H04B 3/542; H04B 3/56; H04B 2203/5433; H04B 2203/5441; H04B 2203/5445; H04L 12/1863
See application file for complete search history.

(56) References Cited

U.S. PATENT DOCUMENTS

| 5,699,276 | A | * | 12/1997 | Roos | .................... G06Q 20/102 379/106.03 |
| 2002/0065583 | A1 | * | 5/2002 | Okada | ..................... H04L 12/66 700/295 |
| 2003/0151491 | A1 | * | 8/2003 | Martin | ................... H04B 3/546 340/5.2 |

OTHER PUBLICATIONS

International Search Report, dated Aug. 18, 2017, from corresponding PCT/IB2017/053359 application.

* cited by examiner

*Primary Examiner* — Sung S Ahn
(74) *Attorney, Agent, or Firm* — Nixon & Vanderhye

(57) ABSTRACT

Disclosed is a device for selectively receiving data broadcast in a network. The device includes first unit for receiving configuration data transmitted in point-to-point mode, second unit for receiving data broadcast by at least one transmitter, by radio and/or by power-line communication, a digital processing sub-assembly, at least one memory for storing at least one datum determining the selectivity of the broadcast, a low-voltage power supply sub-assembly supplied by an energy source and at least one program for determining whether data received by the second unit should be used or ignored by the device, as a function of previously stored data. Also disclosed is a system for allowing devices to selectively receive data broadcast in a network. Additionally disclosed is a method for allowing a device to selectively receive data broadcast in a network.

20 Claims, 7 Drawing Sheets

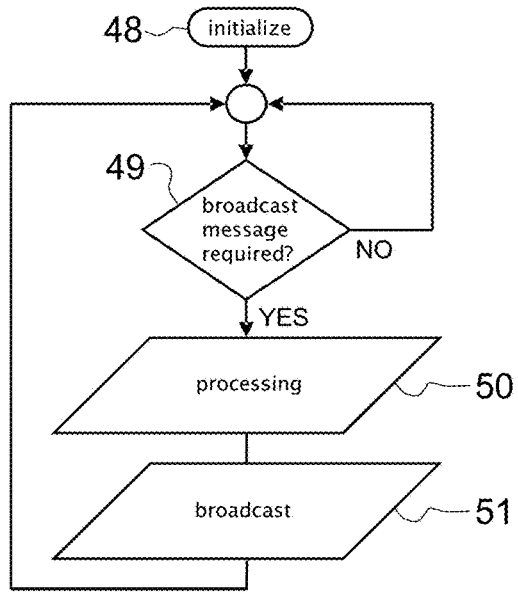
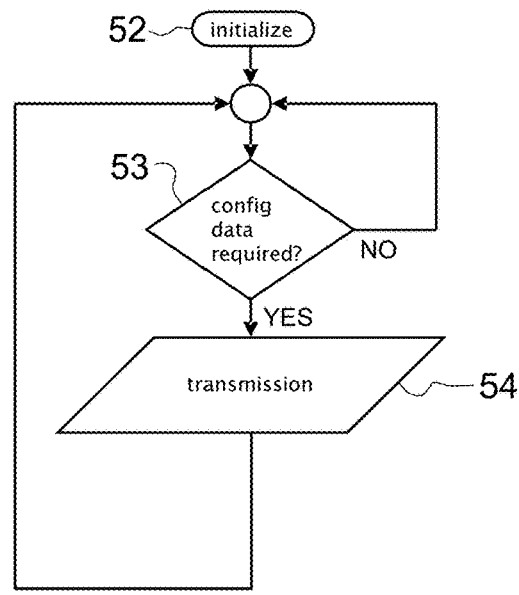
Fig. 11
Fig. 12
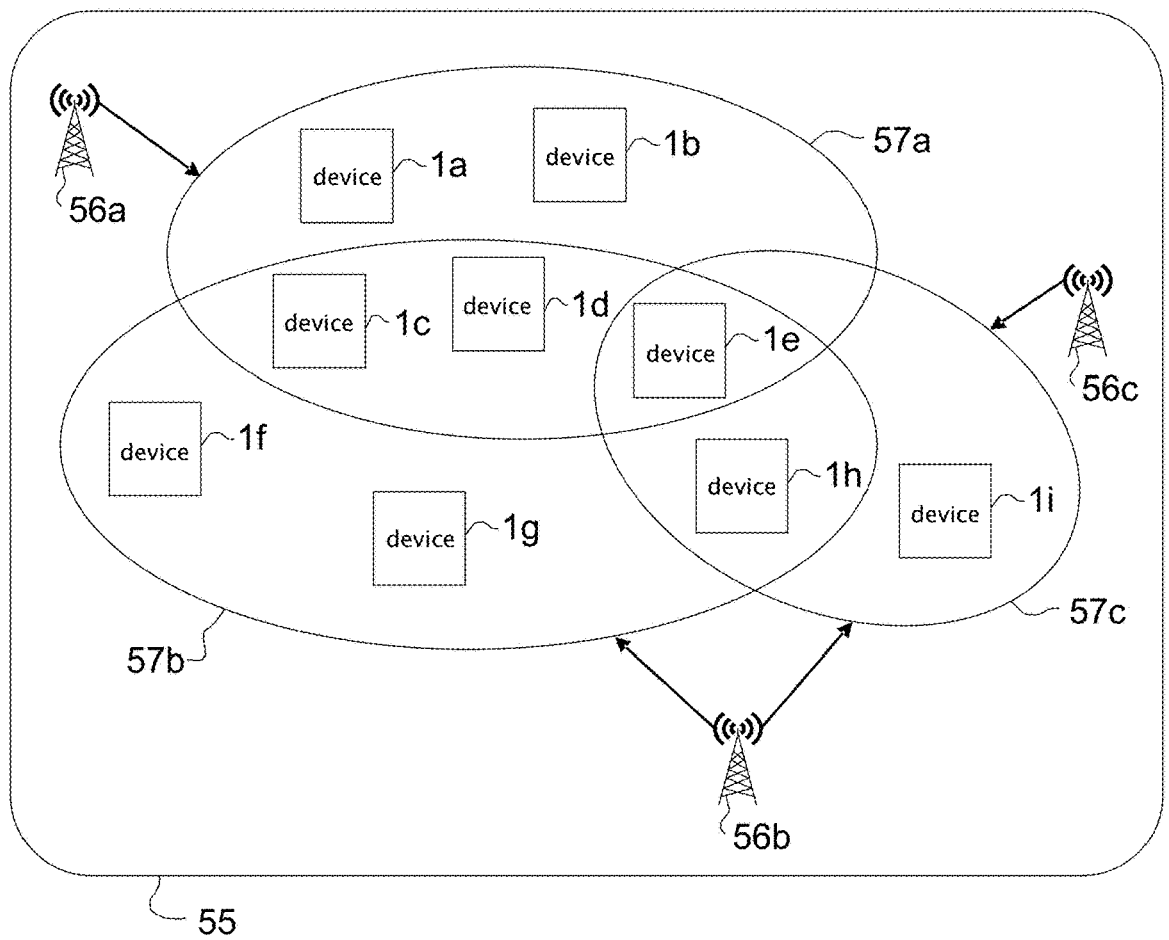
Fig. 13

DEVICE, SYSTEM AND METHOD FOR SELECTIVELY RECEIVING DATA BROADCAST IN A NETWORK

TECHNICAL FIELD

The invention relates to the field of telecommunications.

PRIOR ART

There are needs to which the known technical solutions do not make it possible to satisfactorily respond such as for example the need for the dynamic balancing of the electrical networks or the needs in the field of managing a set of connected objects. Indeed, the balancing of the electrical network requires the simultaneous transmission of remote commands aiming to erase or activate diffuse consumptions simultaneously in a large number of installations, and this over territories of which the coverage requires a plurality of transmitters or transceivers. The cellular telecommunication networks by conventional radio are designed to address one terminal in particular and are not suited for simultaneously broadcasting a message with the same aim to massive quantities of receivers. The broadcast networks of flow of digital radio and television content are optimized for the simultaneous broadcast of the same information to massive quantities of receivers but their capacity to select the broadcast zones is done at a mesh that is too large to meet the needs of a finer sectoring in the field of energy. The new radio networks of the Low-Power Wide-Area type (LPWA) were designed to individually address connected objects with an autonomous supply having information to roll up into an information system. Most of these systems are not natively provided to favor the simultaneous broadcast of information to large quantities of objects of which the reception must remain continuously active. Communication solutions by known power-line communications have the same problems and limitations as the communications solutions via radio, they are also not suited for the needs of the applications concerned by the invention.

DESCRIPTION OF THE INVENTION

The purpose of this invention is to overcome at least partially the problems mentioned hereinabove by proposing technical solutions that can be used in wired and/or wireless terrestrial and/or satellite networks using means of transmission by radio and/or by power-line communication, in order to provide them with a broadcast capacity of data intended for a set of recipients that can be predetermined differently at each broadcast. The broadcast of data according to the invention is both simultaneous and selective, i.e. sent at the same time to a determined sub-assembly of devices among those which are able to physically receive said data.

According to a first aspect, the invention relates to a device for selectively receiving data broadcast in a telecommunication network and/or in a digital signal broadcast network. The device according to the invention comprises:

first hardware and/or software means for receiving at least one configuration datum transmitted in the framework of a point-to-point connection (unicast) between a piece of equipment external to the device according to the invention and said device. Said external equipment belongs to a telecommunication network or is a local isolated apparatus. The communication medium of the point-to-point connection between the device according to the invention and the external equipment, whether the latter is isolated or a part of a network, are the radiated radio frequencies, the power-line communications, an electrical or optical direct wired connection, means based on the modulation of a light radiation with one or several wavelengths, or means based on the modulation of a magnetic field or on the modulation of a sound signal;

second hardware and/or software means for receiving data broadcast by at least one transmitter, by radio and/or by power-line communication. The term broadcast means a simultaneous transmission of the same main data to all of the receivers able to receive it in a general broadcast mode to all of the receivers that belong to a first group predetermined by means of addressing external to the invention which are proper to the telecommunication network used (multicast). The invention also provides for the transmission of different data in a message without however leaving the scope of the broadcast of the same message in terms of the invention. For example the data encoding the transmitter identifier in a message and, where applicable, the service data such as a detection code or error code that depend on it, vary when several transmitters are required to broadcast the same message to a large number of receiving devices in a network. Said data includes for example control data and/or data determining the selectivity of the broadcast and/or additional data. The term data determining the selectivity of the broadcast means all data that can be used in the framework of the invention to limit the effective reception of the data broadcast to only receiving devices that are determined beforehand. The additional data, where applicable, is information of application interest that supplements said control data, for example a power or energy setting, a duration in the case of remote controls with timed status return, a number of operating cycles, a temperature setting, combinations of such parameters, etc. It is also provided that said second hardware and/or software means for receiving data receive the latter indirectly by the intermediary of an external piece of equipment comprising the receiver of data broadcast by radio or by power-line communication. Such a piece of external equipment is for example an electronic smart meter. Said second means for receiving data are in this case wired or wireless means for establishing a local intermediate data connection between the device according to the invention and the external apparatus that receives the data broadcast;

at least one digital processing sub-assembly comprising at least one microprocessor, at least one program memory, a hardware and/or software interface with said first hardware and/or software means for receiving data, a hardware and/or software interface with said second hardware and/or software means for receiving data, a hardware and/or software interface with means for using data received by said second hardware and/or software means for receiving data. The digital processing sub-assembly is according to the alternative embodiments, a combination of integrated circuits mounted on a printed circuit or it is a single component such as for example a general purpose microcontroller or a so-called "system on a chip" (SoC) component which can advantageously implement in the same chip all or part of the electronic semi-conductor means required for implementing the device according to the invention;

at least one memory for storing all or part of the at least one configuration datum and/or of at least one broadcast transmitter identifier. The at least one configuration datum being received by said first means. The at least one broadcast transmitter identifier being received by said second means. This is for example a RAM memory when it is not provided to restore the data in the event of a reset of the device according to the invention. Or when the configuration data can be restored by a point-to-point connection with a piece of local external equipment or with a remote server that ensures the retention of the information. In most of the other cases, the at least one memory is a non-volatile memory of the EEPROM, flash, F-RAM type or any other type of memory or combination of means of data storage and electrical power allowing for the sustainable retention of the information stored. In certain alternatives the at least one memory is implemented in the form of one or several electronic components exclusively dedicated to the memorization function which can be seen and identified on a printed circuit. In other alternatives, the at least one memory is integrated into at least one electronic component such as a microcontroller, a peripheral device with multiple functions or in a system on a chip that also fulfils other functions. Alternatives of the invention are also provided wherein said stored configuration data is stored in different memories according to the nature of the data to be memorized. For example configuration data related to the point-to-point data transmission network is stored in a memory associated with a microprocessor comprised in said first means, configuration data related to the data broadcast network is stored in a memory associated with a microprocessor comprised in said second means, configuration data relating to the use of the data broadcast is stored in a memory associated with a microprocessor comprised in the at least one digital processing sub-assembly;

a low-voltage power supply sub-assembly supplying at least one direct voltage for supplying the hardware means of the device, said supply sub-assembly being supplied by at least one source of energy. The at least one source of energy is for example the electrical network and/or energy captured in the environment of the device by any suitable means such as photovoltaic cells, a wind or wave turbine, a thermoelectric, thermal or thermodynamic generator, making use of the difference in temperature between a hot source and a cold source, a generator making use of mechanical energy for example vibratory or kinetic) and/or an autonomous electrochemical energy source such as a cell, rechargeable cell, a fuel cell, a battery and/or an ultra-capacitor. The low-voltage power supply sub-assembly comprises where applicable one or several electronic components in order to drop the voltage, convert it and/or to regulate it in order to lower or raise the voltage produced by the source of energy according to the needs of the device to be powered. Where applicable, buffer storage means are also provided, such as one or several capacitors, ultra-capacitors or electrochemical batteries or for overcoming any interruptions in the supply of energy by the source;

at least one program for determining whether broadcast data received should be used or ignored by the device according to the received data broadcast determining the selectivity of the broadcast, and of all or part of the at least one configuration datum and/or of the at least one broadcast transmitter identifier having been stored beforehand in the at least one memory.

It is provided that the device according to the invention further comprise at least one program, called an application, in order to use all or part of the data received if it has been determined that it should be used. These programs are stored for example in a program memory associated functionally with a microprocessor of the digital processing sub-assembly. This is for example a memory of the external flash type, or integrated into a microcontroller or in a system on a chip implemented in the device. In certain alternative embodiments, said programs are implemented in the form of distributed processing executed by several microprocessors, said programs are then divided into several sub-programs optionally stored in different memories attached to their respective execution processors.

The term telecommunication network means a data transmission network optimized to establish point-to-point connections between terminals or between terminals and servers. The term broadcast network means a data transmission network optimized to simultaneously broadcast data that is mostly shared to a large number of terminals. Radio and/or by power-line communication means the use of any transmission techniques that use radio frequencies radiated by antennas or frequencies carried by wired installations. It is provided to use means of transmission by terrestrial radio and/or means of transmission by satellite radio.

It is provided to use for transmissions by radio in point-to-point mode that are to be received by said first means, for example a data transmission network by Low-Power Wide-Area of the "Sigfox" type (registered trademark of SIGFOX WIRELESS SA), "LoRa" (registered trademark of SEMTECH Corporation), "NB-IOT" promoted by the 3GPP organization or equivalents, or a cellular telecommunication network of so-called "2.5G" generation or later. It is also provided to use other standardized or proprietor radio standards for example "ZigBee", "KNX", "Z-Wave", "Thread", "WiFi", "Bluetooth" and the variants thereof, future developments, successors and the equivalent. The meshed wireless communication protocols that offer the advantage of increasing the range and the reliability of the data transmissions in the networks, knowing that the point-to-point transmissions according to the invention are not restricted from a latency time standpoint.

It is provided to use for transmissions by radio that are to be received by said second means, broadcast networks of radiophony and of television that offer auxiliary channels for data broadcast that can be used in the framework of the invention in parallel with the main uses of these networks. The device then comprises in the framework of said second means for receiving data, a receiver provided for the analog radiophony as "FM" with an "RDS" data decoder, or a receiver provided for digital radiophony for example in the "DAB" standard or equivalent, or a receiver provided for digital terrestrial or satellite television in the "DVBT" standard or equivalent. It is also provided to receive data broadcast from a second method, or from a profile, dedicated to the broadcast of data which is associated with a telecommunication standard primarily provided for ensuring two-way communication by radio in point-to-point mode.

It is also provided to use transmissions by power-line communication, designated by the acronym PLC in what follows in this document, all types of low- or high-speed PLC, narrowband or broadband, with one or with several carrier frequencies in a frequency range between for example 3001 Hz and 500 KHz. It is also provided to use broadcast techniques by "low-frequency broad-range" PLC based on the modulation of one or of several low-frequency carriers, for example with frequencies between 100 Hz and 3000 Hz. This alternative of transmission by PLC is also known as "ripple control".

It is provided to use for transmissions by PLC in point-to-point mode that are to be received by said first means, for example an infrastructure implementing communications based on standards such as "PLC G3", "S-FSK", "P1901.2", "PRIME" and the variants thereof, future developments, successors and the equivalent.

It is provided to use for the transmissions by PLC that are to be received by said second means, an infrastructure implementing communications based for example on the use of standards such as "EDF HN 96-S-65", "VERSACOM DIN 43861-301", "Landis+Gyr Semagyr", "Ricontic", "RWE", "ZPA", "Telenerc", "Decabit" (registered trademarks) and the variants thereof, future developments, successors and the equivalent. It is also provided to receive data broadcast from a second method, or from a profile, dedicated to the broadcast of data which is associated with a telecommunication standard primarily provided for ensuring two-way communication by PLC in point-to-point mode.

Contrary to known communication protocols, the invention proposes technical solutions based on a two-stage approach involving two transmission methods and optionally two different transmission sub-systems. The invention offers a first advantage which is to be able to use for each one of the two transmission sub-systems, existing solutions possibly already deployed on the geographical zones of interest where it is desired to deploy the selective broadcast solutions according to the invention. The invention also offers the advantage of enabling the implementation of telecommunication solutions optimized to respond to each one of the two conflicting needs which are on the one hand the capacity of establishing reliable point-to-point connections between equipment of a local or network infrastructure and the receiving devices, and on the other hand the capacity of simultaneously broadcasting information to a large number of receiving devices.

The invention furthermore provides that said first means, the at least one configuration datum, said external equipment, said second means, the received data broadcast, the at least one digital processing sub-assembly, and the at least one source of energy, are respectively:
  a radio modem or a two-way radio transceiver used as a receiver, or a radio receiver or a network gateway using radio frequencies in the framework of a wireless local or extended, terrestrial or satellite telecommunication network, or a power-line communication modem or a power-line communication two-way transceiver used as a receiver, or a power-line communication receiver or a network gateway using power-line communication, or an interface for connecting a cable or an optical fiber, or an interface for receiving and demodulating light rays comprising one or several wavelengths, or an interface for receiving and demodulating a variable magnetic field, or an interface for receiving and demodulating sound signals;
  a group identifier, or a source station identifier, or an outgoing network identifier of a source station, or a medium-voltage/low-voltage transformer identifier, or a geographical sector identifier, or an identifier of the electrical use type, or an apparatus category identifier, or an identifier of a manufacturer and apparatus model and/or of an embedded software version, or a user category identifier, or a building category identifier, or a service operator identifier, or a subscribed service category;
  a configuration tool, or an electronic energy meter, or a smartphone, or a digital tablet, or a computer, or a supervision system, or a transmitter, or a transceiver used as a transmitter, or a transponder, or an access point to a local network, or an access point to an extended network;
  a modem or a two-way transceiver used as a receiver, or a receiver or a network gateway using radio frequencies in the framework of a wireless terrestrial or satellite telecommunication network, or a receiver able to receive data broadcast by terrestrial means or by satellite, or a modem or a two-way transceiver used as a receiver, or a receiver or a network gateway using power-line communication, or a ripple control receiver, or a wired or wireless interface for connecting an external sub-assembly for receiving data broadcast by radio or by power-line communication;
  a control for turning on or for turning off, or a control for assigning a determined value to a parameter, or a control for erasing consumption, or a control for storing energy, or a control for load shedding, or a control for load reloading, or a control for information transport intended for an application process external to the invention, or a zero control that has no effect as a control, and/or information determining the configuration data memorized beforehand to be taken into account in one or several identity tests to be conducted with received data broadcast of the same nature, or the expression of a combinatorial function of which the input variables are all or part of the at least one configuration datum and/or all or part of the at least one transmitter identifier, and/or the result of a calculation concerning one or several pieces of configuration data and/or on one or several transmitter identifiers and/or on additional data received and/or stored in a memory of the device, the result of the combinatorial function being a logic state that determines whether the information received should be used or ignored by the device, and/or at least one parameter in line with control data, and/or at least one parameter in line with data determining the selectivity of the broadcast, and/or a broadcast transmitter identifier;
  at least one microcontroller, or at least one system on a chip, or at least one processing unit available in the form of a printed circuit whereon are mounted components and connectors in order to form a digital processing module that has standardized technical characteristics, for example an industrial modular computer in the standard PC104, an electronic board of a low-cost modular computer such as Raspberry Pi (registered trademark of the Raspberry Pi Foundation) or Arduino (registered trademark of Arduino team) etc.;
  the electrical network, and/or at least one photovoltaic cell, and/or an electrokinetic generator, and/or a battery, and/or an electrochemical cell;

A modem or a two-way transceiver corresponds for example to the alternative embodiments that use a complete technical sub-assembly in the form of a module, of a set of integrated circuits or of a system on a chip, in order to allow the device to receive data by radio or by PLC. The communication between the at least one digital processing sub-assembly of the device and the modem or the transceiver is accomplished most often by means of a serial connection. The appellation modem is most often used for modules of which the interface with the host processor uses a protocol based on standard commands such as the "HAYES" or "AT" commands. The appellation transceiver is rather used in the case of transmitting/receiving components of the system on a chip type communicating with the host processor in a more specific manner, for example via an inter-component communication port of the "SPI", "UART", "I2C" or "SDIO" type allowing for data exchange directly in the registers. The function of a transceiver is the same as that of a modem, both are suitable for implementing the invention. Certain networks require the use of transmitting and receiving means in order to establish the connection even if the implementation of the invention requires only data reception. Certain networks make it possible to receive data without any prior exchange, by means of a receiver alone. The implementation of the device according to the invention is then simplified and its cost is reduced where applicable. The invention provides to use all means known to transmit data specifically to a given device, even to a group of devices in the framework of a first network, with this group of several "physical devices" thus forming the device (logical) that is unique in terms of the invention. An electrical or optical connection with an external apparatus corresponds for example to the case of a permanent connection with a third-party apparatus such as an electric meter having information that is likely to be used entirely or in part, directly or after transformation such as configuration information that can be used for the selective broadcasts according to the invention. The external apparatus can for example have been configured during the installation thereof and transmit to the device according to the invention one or several elements of information that can be used by means of a local connection. It is also provided that the external apparatus plays the role of a network gateway between the device according to the invention and a first telecommunication network to which it is connected by a two-way connection that implements one or several communication standards by radio or by PLC already mentioned. It is also provided that the external apparatus be connected to the device according to the invention by a wired, optical, acoustic point-to-point local connection, or based on a magnetic and/or modulated electric field. It is also provided that the electrical or optical connection with an external apparatus correspond for example in the case of a temporary connection with an apparatus used by an installer in order to configure the device during the installation thereof. Such an apparatus is for example a specific tool or a smartphone, a digital tablet or a portable computer equipped where applicable with an adapter in order to render the standard terminal compatible with said first hardware and/or software means for receiving data;

It is also provided to use only as a receiver means of data transmission that are natively two-way such as a modem, a transceiver or a network gateway that implements the standards mentioned hereinabove.

The invention further provides that said first and second hardware and/or software means for receiving data are hardware and/or software means that are at least partially shared, able to receive data in the framework of a point-to-point connection, and to receive data broadcast simultaneously to a plurality of receivers. These are alternative embodiments of the invention wherein the physical data transmission media are of the same nature, for example by radio, and that shared hardware and/or software means such as one or several integrated circuits forming a receiver can be used for receiving said configuration data in point-to-point mode and also said data broadcast to a plurality of receivers in a general and/or multipoint broadcast ("broadcast" or "multicast") of the transmission system used in order to receive control data accompanied where applicable by other associated information in the multicast broadcast mode according to the invention. This is the case for example of the "EFR32FG" or "EZR32LG" components from the company Silicon Labs, of the "SX1272" or "SX1239" components from the company Semtech etc.

The invention provides that said first or second hardware means, or the shared hardware means for receiving data, further comprise said digital processing sub-assembly and/or the at least one memory for storing all or part of the at least one configuration datum and/or at least one broadcast transmitter identifier.

These are advantageous alternative embodiments of the invention wherein technical means that are normally provided in the framework of means for receiving data are also used for carrying out the digital processing that is proper to the invention and also, where applicable, for storing in a non-volatile manner said configuration information. Indeed, certain electronic components, called circuits on a chip, include a so-called "application" microprocessor with one or several associated memories that can be accessed or the residual calculation power and of the free space in one or several memories (program, working RAM, non-volatile memory) in a shareable built-in processing unit. All or part of these excess hardware resources that can be accessed being advantageously useable for implementing the method of receiving according to the invention. This is the case for example of the "ATA8510" component from the company Atmel, the "EFR32FG" or "EZR32LG" components from the company Silicon Labs, the "nRF9E5" component from the company Nordic Semiconductor, the "CC1310" or "CC2630" components from the company Texas Instruments (registered trademarks) etc.

The invention provides that said first or second hardware and/or software means, or the shared hardware and/or software means for receiving data, further comprises hardware and/or software means for transmitting data to at least one remote information system. For example this advantageously entails using the transmitting sub-assembly of a two-way transceiver used as a receiver in the framework of the invention in order to allow the device according to the invention to transmit data to a remote information system. This is most often means for transmitting associated with said first means for receiving data. Indeed, the need to associate the data transmitted by the ascending channel with a single device in most applications, predisposes the use of a two-way point-to-point connection. The implementation of this refinement of the invention in the context of managing an electrical network makes it possible to roll up into one or several remote information systems load curves and/or global meter indexes according to different rate tiers, sub-meter indexes of electrical energy through use or information linked to the storage or the erasing of energy or with the electrical vehicle. It is also provided to roll up meter information other than linked with electricity, for example information concerning metering or usage with respect to gas, heat, water, the safety of the premises or the health of the occupants of the premises, etc.

The purpose of the invention is also at least partially achieved by means of a system for allowing for a plurality of devices according to the preceding claims for selectively receiving data broadcast in a telecommunication network and/or in a digital signal broadcast network. The system according to the invention comprises:

at least one piece of external equipment or a first network infrastructure for transmitting data able to be received by said first hardware and/or software means of a device according to the invention. This is for example a network infrastructure comprising at least one transmitter or a transceiver or a network gateway or a transponder using radio frequencies, or at least one transceiver or a network gateway using power-line communication, or an interface for connecting a cable or an optical fiber, or an interface for modulating and transmitting light rays at one or several wavelengths, or an interface for modulating and transmitting a variable magnetic field, or an interface for modulating and transmitting sound signals, for transmitting data able to be received by said first hardware and/or software means for receiving at least one configuration datum of a device. These means for transmitting transmit data to each one of the receiving devices according to the invention in the framework of a point-to-point connection. According to alternative embodiments, the point-to-point connection is at least one-way in the transmitter-to-device direction, or, where applicable, the connection is two-way when there is a return channel for the transmission of data from a device to at least one remote information system;

at least one second network infrastructure, or a second operating method of the first network infrastructure, comprising at least one broadcast transmitter for broadcasting by radio and/or by power-line communication data that can be received by said second hardware and/or software means of the devices according to the invention. This is for example a network infrastructure, comprising at least one transmitter or a transceiver or a network gateway or a transponder using radio frequencies and/or at least one transceiver or a network gateway using power-line communication, for broadcasting data that can be received by said second hardware and/or software means for receiving data of the devices. The invention provides for the use of all types of data transmitting systems able to offer at least one simultaneous broadcast mode to several receivers. For example transmission systems optimized for the broadcasting of radiophony, television, time or positioning information, which transmit their data without logical addressing restriction to all of the receivers which are within their physical range. Other systems are also provided for providing a first level of control of the selectivity of the broadcast of data through the bias of a multipoint logical addressing system external to the invention. The combination of the solutions for controlling the selectivity of the data broadcast according to the invention with one broadcast per multipoint addressing of the first level in the state of the art makes it possible to obtain a system for the selective broadcasting of data operating with a finer geographical mesh and/or of which the selectivity is more adjustable than what known solutions allow for. In a context of electrical network management, this makes it possible for example to overlay more precisely a broadcast network using radio frequencies with an electric distribution network which by nature is entirely determined from a geographical standpoint by the location of its lines and of its electrical cables;

a first information system, referred to as "network", for determining at least partially the data to be broadcast by the at least one second network infrastructure or by the second operating method of the first network infrastructure in order to achieve a predetermined operational objective.

It is provided that said first information system further determines at least one configuration datum to be transmitted by the first network infrastructure to devices according to the invention in the framework of point-to-point connections. It is provided for example that the first "network" information system be configured to transmit one-by-one to all of the devices that can be individually addressed in a first telecommunication network of a pre-established list, the appropriate configuration data in order to predetermine the selectivity desired during later broadcasts. It is also provided that the configuration data only partially determines the selectivity of the broadcasts when the effective selectivity of the broadcast is also determined by the controls broadcast and/or by associated data in combination with configuration data previously received and stored in each device.

It is provided that the system according to the invention further comprises at least one second information system, referred to as "business", specialized in a field of use and able to transmit to said first information system said predetermined operational objective to be achieved. The at least one second "business" information system is for example the information system of an electricity distributor or of an electrical network manager, or of an aggregator in charge of maintaining the balance between energy production and consumption is all or a part of an electrical network. This is also for example the information system of a producer of renewable energy who wishes to offset its unknowns in production in order to avoid economic penalties. This is also the information system of an operator that supplies hot water using diffuse electrical water heaters of which it remotely controls the heating periods in order to benefit from the best purchase costs of electricity thanks to the heat storage capacity of the water heaters. It is also the information system of an operator of a fleet of electric vehicles or of diffuse static electrical storage capacities for storing electrical energy when it is in excess and for reinjecting it into the electrical network when it is deficient. That said, the invention is not limited to uses in the field of energy. It is also provided for example that the business information system be that of an advertizing agency that manages for example billboards in the form of urban furniture and/or advertizing surfaces placed outside and/or inside individual vehicles, public transport, goods transport, carried by persons, etc. It is also provided that the business information system be that of a territorial government for broadcasting information or alerts to all or part of the persons present on its territory, or the information system of an operator in charge of monitoring or of protecting property and persons, or the information system of a manager of a fleet of vehicles such as bicycles proposed as self-service on a given territory, etc.

Note that the "network" information system/"business" information system dichotomy is a convention in order to make the description of the invention clearer. This does not presuppose any particular organization of those involved in implementing the invention. For example a "business" operator can, for economical and/or strategic reasons, integrate all or part of the "network" information system in terms of the invention into its organization. This in particular if it has internal solutions that can be used for broadcasting data, even, for establishing point-to-point connections with the devices, or if it is considering for this to use self-service solutions such as those in the "LoRa" standard. Inversely, telecom network operators, such as for example "Sigfox" can integrate into their service offering, "business" services that target third-party operators specialized in integrating all or part of the "business" information system in terms of the invention into its single information system.

It is further provided in the system according to the invention that said operational objective to be achieved be directly or indirectly related to a cumulative quantity of power and/or of electrical energy, to be erased or to be consumed or to be stored or to be restored on a predetermined geographical territory and/or in a predetermined portion of an electrical distribution network.

It is further provided in the system according to the invention that said operational objective to be achieved be directly or indirectly related to the synchronization of at least one action in a plurality of devices according to the invention and/or for managing and/or for administering a set of such devices. This entails for example triggering substantially at the same moment in a predetermined set of devices according to the invention, the reading of at least one meter index, one or several measurements of physical magnitudes, actions involving at least one actuator controlled locally by each one of the devices addressed according to the invention, the transmission by the addressed devices of information intended for a remote information system, combinations of such actions within the same devices according to the invention etc.

The purpose of the invention is also at least partially achieved by means of a method for allowing a device according to the invention to selectively receive data broadcast in a telecommunication network and/or in a digital signal broadcast network, with the method comprising the steps implemented by hardware and/or software means:
  of receiving data broadcast, by said second hardware and/or software means for receiving data of the device;
  of processing concerning all or part of said received data broadcast and all or part of data that was previously received by said first means and/or by said second means for receiving data of the device;
  of determining whether the broadcast data received should be used or ignored by the device according to the result of said processing.

It is provided that the method according to the invention further comprise the steps:
  of receiving at least one configuration datum by said first hardware and/or software means of the device in the framework of a point-to-point connection with external equipment;
  of writing in the at least one memory of the device of all or part of the at least one configuration datum received.

It is provided that the method according to the invention further comprise the steps:
  of extracting a broadcast transmitter identifier in the received data broadcast;
  of writing in the at least one memory of the device a one-to-one identifier of the broadcast transmitter. According to the alternatives, it is provided that the broadcast transmitter identifier be all or part of the at least one datum extracted from the broadcast message received. When the identification data of the transmitter is too voluminous, for example in the case of an IPv6 address, it is provided to use for example a code coming from a suitable hash function as an identifier with a one-to-one correspondence with the complete identification of the broadcast transmitter in the telecommunication network.

Indeed, the invention does not provide solely to use said configuration data of the device to predetermine the selectivity of the broadcast. It is also provided to use the identifiers of transmitters, alone or in combinations with said configuration data. The invention provides to associate identifiers with transmitters and/or with base stations and/or where applicable with antennas if they can be selected individually in a given base station of a telecommunication network by radio and/or by PLC. In order to improve the clarity of the description, mention shall be made of broadcast transmitter identifiers which is the notion shared by all types of networks regardless of the transmission media and any sub-addressing on emission points. It is provided to use these identifiers in order to render selective the broadcast of a message with a topological mesh that is finer than the physical range of the transmitters concerned. The notion of "logical range" of the broadcast is as such defined which corresponds to the effective range obtained after application of the selectivity criteria according to the invention to messages broadcast in the framework of the "physical range" of the transmitters. The notion of "physical range" of the transmitters in terms of the invention is also assimilated with the optional application of a first level of selectivity external to the invention. It is provided that the devices according to the invention memorize the identifiers of transmitters of which they physically receive at least one message, this whether or not they are addressees. Several alternatives and refinements for implementation are provided for the memorization of the transmitter identifiers. For example an unconditional memorization of the identifiers as valid receptions occurs from a physical standpoint, i.e. before the application of the processing providing the selectivity according to the invention, in a non-volatile memory which is periodically erased upon reception of a specific control message transmitted to the devices by broadcast or in point-to-point mode by the "network" information system. This purpose of this refinement is that the devices can be updated according to the changes in the telecommunication network. The latter most often becomes denser over time, which leads to adding new identifiers in the memory of the device. However, there can also be transmitters of which the identifiers have been memorized in the past by a device and which are no longer in the capacity of being received by this device for reasons coming from the network, the device or its environment. It is also provided that the broadcast transmitter identifiers be memorized in a volatile memory included in the devices. This memory is systematically erased when the hardware is reset and is also advantageously reset periodically at the expiration of a timer executed locally in the devices so that the latter regularly reconstruct their transmitter address table and adapt frequently enough to any disappearances of transmitters. On the other hand it is provided that all or part of the broadcast transmitter identifiers be used by the devices in order to determine whether the data of a received message should be used or ignored according to the logic state of a global combinatorial logic function or the result of the logic combination of the logic states coming from the individual tests conducted on the data contained in said message received. The combinatorial logic function has for input transmitter identifiers. Tests are conducted in order to determine whether or not the transmitter identifiers are present in the memory of the device. It is also provided to refine the selectivity of the broadcast by combining the selectivity criteria of the broadcast based on transmitter identifiers with other criteria based on configuration data stored in a memory of the device. The broadcast of data remains simultaneous in terms of the invention as long as the effects of the time spreading of several successive transmissions of a message by several transmitters remain negligible from a data usage standpoint. A spreading of the transmissions of messages by several transmitters can indeed be rendered necessary in order to prevent collisions, in order to comply with normative constraints or in order to allow the receivers to resynchronize correctly before receiving a new message. Refinements in the encoding of the transmitter identifiers are also provided, for example by using a suitable hash function, in such a way that the transmission thereof is compatible with the limited transport capacity of certain telecommunication networks and that the storage thereof is compatible with the limited memory size of certain components used for low-cost implementations of the invention.

It is provided that the method according to the invention further comprise a step of transmitting by the device to a remote information system, of at least one configuration datum and/or of at least one one-to-one identifier of a broadcast transmitted of which the device receives the messages, on the occasion of a trigger event. Said trigger event is for example the resetting of the device according to the invention, a change in the value of a configuration datum, the receiving of a new transmitter identifier, the receiving by said first means or by said second means of a request involving the transmission of at least one configuration datum.

It is provided that the method according to the invention further comprise the steps:
- of taking account by an information system of an operational objective to be achieved by the selective broadcast of at least one message;
- of elaborating by said information system of the content of the at least one message to be broadcast, according to the action to be accomplished by the devices that use the received data broadcast and the selectivity of the broadcast required to achieve the operational objective, all or part of said content being elaborated using data stored in at least one database to which said information system has at least read access;
- of broadcasting at least one message in the network by at least one broadcast transmitter selected by the information system in order to determine a first level of selectivity of the broadcast based on controlling the coverage of the at least one selected transmitter.

It is provided that the method according to the invention further comprise a step of taking account by said information system of feedback on the effect obtained by the selective broadcast of the at least one message in order to repeat the steps described hereinbelow with a new operational objective aiming to cancel the difference between the objective effect and the obtained effect, or until said difference is considered as being negligible, i.e. until the initial operational objective is considered as being achieved.

It is provided to use the method according to the invention in particular in order to balance the production and the consumption of electricity in an electrical network, and/or in order to protect its integrity, by acting remotely downwards or upwards on the consumption of a plurality of diffuse power loads controlled directly or indirectly by devices according to the invention.

It is also provided to use the method according to the invention in particular to synchronize one or several actions in a plurality of devices according to the invention. This use is provided for devices connected to an electrical network but also for devices powered by one or by several autonomous sources of energy. This entails for example synchronizing an internal action within a set of devices such as the sampling of a measurement, the triggering of a session for reading one or several pieces of information such as meter indexes, the triggering of a data transmission session from a time synchronization signal broadcast to each one of the devices of a targeted set according to the invention. The induced data transmissions from each device concerned to a collection infrastructure are carried out in the framework of point-to-point connections which are advantageously distributed over time from the shared synchronization signal in order to optimize the use of the network while preventing collisions. It is also provided to use the method according to the invention for managing and/or for administering a set of devices according to the invention or external apparatuses connected to devices according to the invention. This entails for example effectively updating built-in software in the devices according to the invention or in third-party equipment locally connected to the devices which are used in this case as telecom gateways. This entails for example simultaneously broadcasting built-in software updates, or shared operating parameters to a large quantity of objects addressed selectively according to predetermined criteria according to the invention. This is particularly advantageous from an effectiveness standpoint in the case of low-speed radio networks or the long time required for the transport of all of the update data can be offset by the fact that the invention makes it possible to update in parallel large quantities of objects that belong to a predetermined set. This also entails for example using the invention to effectively update usage rights for all or part of the functionalities of the devices according to the invention or of third-party equipment that are connected locally to them according to subscriptions taken out or economic transactions that have been carried out, or that have not been carried out although they should have been.

BRIEF DESCRIPTION OF THE DRAWINGS

Other advantages and characteristics of the invention shall appear when examining the detailed description of embodiments that are in no way limiting, and of the annexed drawings wherein:

FIG. 11 shows the method of selective broadcast of data on an objective.

FIG. 12 shows the method of updating the network database.

FIG. 13 shows the selectivity according to broadcast transmitters.

DETAILED DESCRIPTION OF THE FIGURES AND OF EMBODIMENTS

Figure 1:
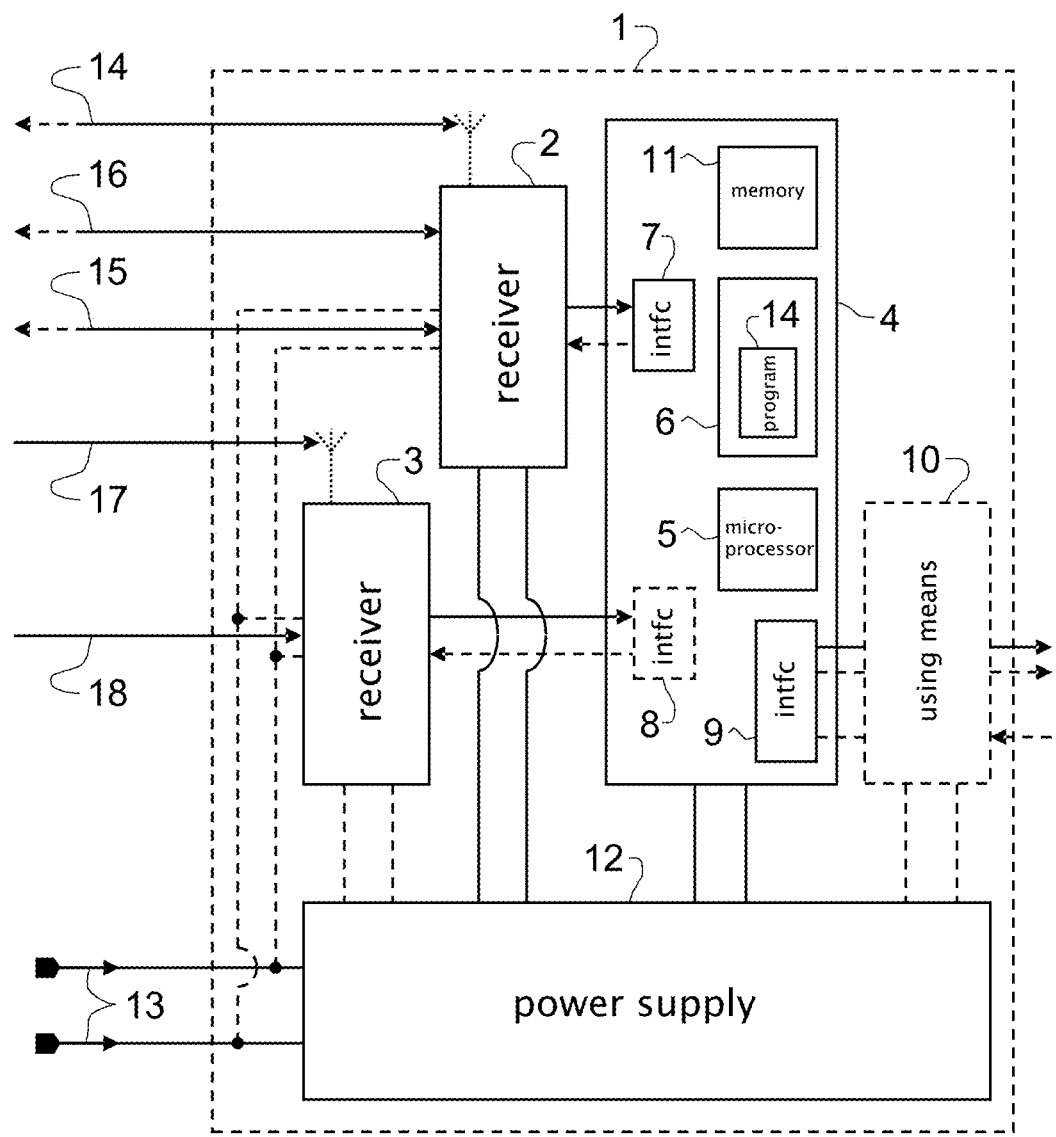
FIG. 1 shows the structure of the device according to the invention.

Other particularities and advantages of the invention shall further appear in the description hereinafter. In the annexed drawings given by way of non-limiting examples:

FIG. 1 shows the structure of the device according to the invention.

The device 1 comprises first hardware and/or software means 2 for receiving at least one configuration datum transmitted in the framework of a point-to-point connection between an external piece of equipment, part of a telecommunication network or isolated, and said device. The choice of implementing the means 2 are determined by the type of physical and/or logic connection of the external equipment to which it is provided to connect to. The invention provides that the means 2 make it possible, alone or in combination with the digital processing sub-assembly 4, to establish a point-to-point data connection by radio 14, and/or by PLC 15 and/or by any other means 16. These connections are at least one-way in the direction going from the external equipment to the device according to the invention. It is frequent however that in the case of connections by radio and by PLC, the connections are two-way. Indeed it is frequent that the communication protocol used imposes communications in both directions at least for establishing the connection and where applicable for controlling the data flows, for rolling up acknowledgements of receipt to the transceiver etc. The device also comprises second hardware and/or software means 3 in order to receive data broadcast by at least one transmitter, by radio and/or by PLC. The data received includes for example control data and/or data determining the selectivity of the broadcast and/or additional data, and/or a broadcast transmitter identifier. Said data is broadcast simultaneously to a plurality of receivers by radio and/or by PLC. The invention provides that the means 3 make it possible, alone or in combination with the digital processing sub-assembly 4, to receive data broadcast by radio 17, and/or by PLC 18. The means 3, which are optimized to receive data broadcast to massive quantities of receivers, are most often one-way in the direction going from the broadcast infrastructure transmission equipment to the devices. The at least one digital processing sub-assembly 4 comprises at least one microprocessor 5 accompanied by hardware resources required for the operation thereof such as for example a clock source, for example an external quartz supplemented where applicable for example with a few passive components such as two capacitors, a built-in oscillator, a clock generator comprising a phase lock loop etc.; one or several working memories, for example of the static or dynamic RAM type arranged according to singlor multi-core architectures of the microprocessor, with or without an instruction cache, based on registers or not, etc. The at least one digital processing sub-assembly 4 also comprises at least one program memory 6. This is advantageously non-volatile memory, for example of the "Flash" type, and more advantageously non-volatile memory arranged so that at least one portion of its capacity can be rewritten in situ in such a way that the software of the device can be updated easily, even in the most sophisticated alternatives, be updated automatically remotely. In addition to the conventional case of a program executed by a single processor, the case of an execution distributed into several microprocessors sharing a program memory or each having a dedicated program memory is also provided. The at least one digital processing sub-assembly 4 also comprises a hardware and/or software interface 7 with said first hardware and/or software means 2 for receiving data and a hardware and/or software interface 8 with said second hardware and/or software means 3 for receiving data. There are many alternative embodiments of the invention according to the hardware, software or combined nature of said first and second means for receiving data, according to whether these means for receiving data are external or built into the at least one digital processing sub-assembly 4, or reciprocally whether the at least one digital processing sub-assembly 4 is built into the first means, into the second means, or into combined means for receiving data. The interfaces referred to are for example, when it entails interacting with an external modem, one or several functional built-in hardware blocks provided to ensure serial communications between sub-systems or between electronic components, for example functional blocks of the "UART", "SPI", "I2C", "I3C", "USB", etc. type. It is also provided to use common peripheral devices frequently associated with a microprocessor in more integrated components such as microcontrollers or systems on a chip. This is for example input-output lines and/or an input interrupt used to emulate a "UART", "SPI", "I2C", "I3C", "USB" etc. hardware block, in particular when it entails low-speed data transmissions for which the emulated embodiments have sufficient performance without overloading the microprocessor. It is also provided that the interfaces be exclusively software when the means for receiving data are implemented by software in the same execution environment as the other processing of the device according to the invention, for example in the case of a digital receiver of vocal frequency remote controls. Such software interfaces can for example use most of the technical solutions known to those skilled in the art for exchanging data and/or for synchronizing processes implemented by software (by positioning flags, by the intermediary of the stack, by "software interrupt", by calling a sub-program etc.).

The at least one digital processing sub-assembly 4 also comprises a hardware and/or software interface 9 with means 10 for using data received by said second hardware and/or software means for receiving data. The nature of the hardware and/or software interface 9 depends on the nature of said means 10 for using data received according to the invention. In the simplest case of an autonomous apparatus of the "remote controlled relay" type comprising a receiving device according to the invention, the means 10 include at least one relay and its electronic control circuitry using the logic state of an input-output line concluded in the interface 9. In the case of more sophisticated apparatuses that comprise a receiving device according to the invention, for example an energy manager, or a heating and/or air conditioning appliance and/or an appliance for producing domestic hot water, the means 10 for using the data received are for example an electronic sub-assembly for the thermal regulation and management of the functionalities of the apparatus. The corresponding interface means 9 are then for example according to the choices for implementation, for example an "UART", "SPI", "I2C", "I3C", "USB" in the form of a specialized hardware block or of an emulated functional block. It is also provided to use as an interface means, input-output lines directly connected to the sub-assembly using the data or connected after current amplification through the use of a buffer circuit or after galvanic insulation through the use of optical, capacitive or inductive couplers. It is also provided in certain applications for example for remotely controlling the operation of an air conditioner, that the interface means be an infrared signal transmitter compatible with those expected by the remote-control receiver of the air conditioner. Said infrared signals being modulated by means of a suitable software in order to emulate the signals transmitted by the native manual infrared remote control of the apparatus. Each hardware resource implemented for carrying out a functional interface block 7, 8, 9 is supplemented by one or several suitable software for controlling it and/or for carrying out a function emulation or sub-function usually handled by a specialized hardware block. Note that the use of data received according to the invention does not concern only the controlling of loads, actuators or external apparatuses. It is also provided that the receiving of a command broadcast selectively according to the invention be used to acquire information such as for example the functional state of a piece of external equipment, a measurement of one or several physical magnitudes, of a physiological parameter of a person, etc.

The device according to the invention further comprises at least one memory 11 for storing all or part of the at least one configuration datum and/or at least one broadcast transmitter identifier. All of the known and future non-volatile memory technologies are suitable for the use which is made thereof in the framework of the invention, for example "RAM" memory with powered backup, "EEPROM", FeRAM, MRAM, NRAM, PRAM, RRAM etc. Technologies with less endurance than the preceding ones in number of write cycles such as the memory of the rewritable "Flash" type in situ can also be used in the framework of the invention as memory 11 in light of the low frequency of the updates to the configuration data in most of the cases of use and of techniques that can be implemented by software in order to increase the endurance of such memories. It is provided that in alternative embodiments of the invention said configuration data to be permanently stored be distributed into several physically separated memories according for example to the nature of the data and to the availability of memory resources. Indeed, it is frequent to find a non-volatile memory block in most highly-integrated semi-conductor circuits since the need for storing sampling or configuration data exists in most applications. It is indeed common to find at least one functional block of non-volatile memory in microcontrollers, in systems on a chip and even in interface circuits, conversion circuits or in semi-conductor sensors. These blocks of non-volatile memory are generally arranged to offer an excess storage capacity relative to the primary needs that justified the integration thereof into a component, and so that all or part of the storage capacity is freely accessible by means of a suitable hardware and/or software interface. According to alternative embodiments, it is provided that the invention use a memory included in the at least one digital processing sub-assembly 4, and/or in said first hardware and/or software means 2 for receiving at least one configuration datum and/or in said second hardware and/or software means 3 for receiving data. The low-voltage power supply sub-assembly 12 provides at least one direct voltage suitable in voltage and in current for supplying the hardware means implemented in the framework of a given alternative of the invention. This entails for example providing a direct voltage of 5 V to the at least one digital processing sub-assembly and, where applicable, to the first, second or combined means for receiving. The low-voltage power supply sub-assembly 12 also provides where applicable the voltage or voltages at the suitable currents to said means 10 for using the data received, in the case of at least one electromechanical relay, the power supply 12 provides for example a direct voltage of 24 V at a rate of for example 50 mA per relay implemented. The source of energy 13 is most often the low-voltage electrical network for example at 230 VAC or 110 VAC, at 50 or 60 Hz, in particular in the embodiments of the invention receiving data by power-line communication and/or in those of which the use of data requires a connection to the electrical network as in the case of controlling all of the electric power apparatuses. It is also provided that the source of energy 13 comes from a low direct voltage network such as for example that of a vehicle network at 12 VDC, 24 VDC or 48 VDC. Uses of the invention are also provided in the framework of autonomous smart objects and/or with very low power, for example environmental data sensors or in relation with the monitoring of high-voltage networks or in the framework of connected medical devices for measuring physiological parameters, when it is desired to synchronize the sampling of measurements and/or the time spreading of the resulting data transmissions by radio. In these alternative embodiments of the invention it is provided that the source of energy 13 be for example an electrochemical generator such as a lithium battery or any suitable generator for collecting energy in the environment of the device according to the invention and transforming it into electricity. For example a photovoltaic, electroaeraulic, electrokinetic, electrothermal generator, with the generator being supplemented where applicable by a means of buffer energy storage such as one or several ultra-capacitors or an electrochemical battery for overcoming any intermittences in the supply of energy.

The device according to the invention further comprises at least one program 14 for determining whether broadcast data received should be used or ignored by the device 1 according to the received data broadcast determining the selectivity of the broadcast, and of all or part of the at least one configuration datum and/or of the at least one broadcast transmitter identifier having been stored beforehand in the at least one memory 11. According to alternative embodiments, the program is for example executed entirely or in part by the at least one microprocessor of the at least one digital processing sub-assembly 4 and/or by a microprocessor included in said second means 3 for receiving data and/or by a microprocessor included in the means shared by functional sub-assemblies 3 and 4 or shared by functional sub-assemblies 2, 3 and 4.

The embodiments of the invention shown in the following figures will clarify in more detail the implementation of the invention in the main cases of use provided for.

Figure 2:
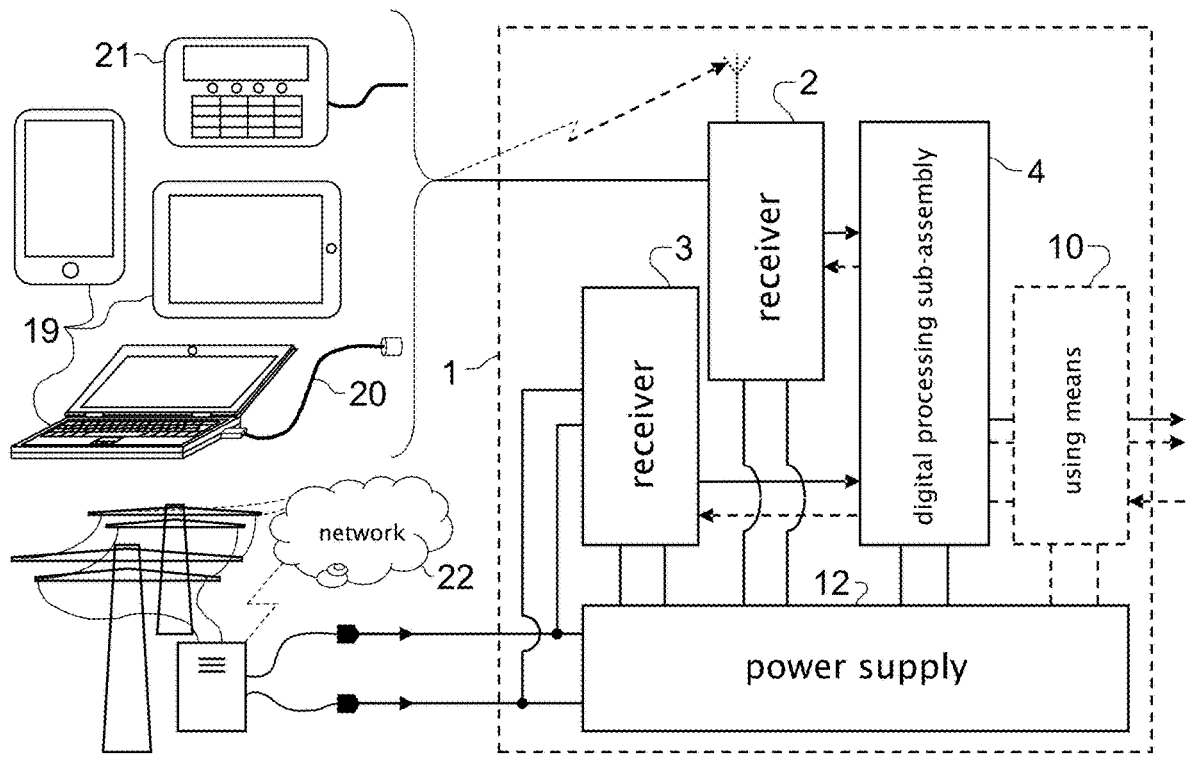
FIG. 2 shows the combination: local configurator and PLC broadcast.

FIG. 2 shows the combination: local configurator and PLC broadcast.

In this alternative of the invention, said first hardware and/or software means 2 for receiving so-called configuration data are means for establishing a point-to-point connection with a local configuration tool used by the installer of the device 1. The local configuration tool is for example a standard apparatus 19 capable of executing an application software that can be used to configure the device according to the invention. This is for example a smartphone, a digital tablet or a portable computer. The application software is for example software specifically designed for the configuration of the device according to the invention or a universal standard application software such as a terminal emulator or a web browser. Indeed, certain alternative embodiments of the invention incorporate a web microserver that makes it possible to use a standard browser to locally, even remotely, configure the device. When said first means for receiving configuration data do not correspond to a wired or wireless connectivity standard initially proposed on the apparatuses 19, such as for example USB, Bluetooth, WiFi etc., an adapter 20 that is specific to the implementation of the invention is provided. Such an accessory is for example a cable of which one end is terminated by a connector compatible with a standard port available on most terminals, for example a so-called "host" USB port, and the other end is terminated by a coupler that is specific to the implementation of the invention. This technical solution is often the only wired solution possible for reasons of conformity with the electrical safety standards when the low-voltage electronics of the device according to the invention are not isolated from the electrical network as is generally the case with energy management apparatuses. The coupler at the end of the cable 20, on the device side, makes it possible according to the alternative embodiments to establish a one-way or two-way connection by the intermediary of an optical, acoustic, inductive, capacitive, etc. coupling. It is also provided to use as a configuration tool an apparatus of the terminal type 21 designed specifically for the configuration of devices according to the invention, with the specific terminal being where applicable equipped with the suitable coupler. Said second hardware and/or software means 3 for receiving data are a receiver of signals transmitted by PLC. This is for example a sub-assembly designed exclusively for receiving PLC signals, or a two-way transceiver used as a receiver. In certain alternative embodiments, for reasons of ease in supplying specialized electronic components which are natively two-way, it is provided to optimize the carrying out of the second hardware means by using a two-way PLC modem integrated circuit but by not mounting the components used exclusively for data transmission and by under-sizing the technical characteristics of the components shared when receiving and transmitting data. This in particular on the functional block known to those skilled in the art under the name of "analog front" of which it is possible to suppress the power amplifier and to under-size the high-frequency coupling to the low-voltage electrical network relative to a two-way implementation. Such sub-equipment also allows for indirect gains on the space and on the cost of the low-voltage power supply 12 of the device of which the power can be substantially reduced due to the suppression or the deactivation of the transmission portion of a two-way transmission sub-assembly. It is also provided that said second hardware and/or software means 3 be a "low-frequency broad-range" PLC receiver referred to as ripple control. For example in France a receiver compliant with standard "EDF HN 96-S-65" variant 175 Hz and/or 188 Hz, full or half-tone version. The choice of said variant and/or of said version in the case of ripple control, or in the case of high-frequency PLCs, the choice of other parameters that affect reception in that they characterize for example modulation options or the choice of carrier frequencies, are where applicable part of said configuration data according to the invention in order to predetermine the technical parameters of the reception by said second means of the data broadcast. A telecommunication network 22 associated with the at least one information system comprises the transmission resources involved in the broadcast of data. Here, when it entails a broadcast by ripple control, the at least one information system controls one or several transmission bays located in sources stations of the electrical distribution network via a telecom infrastructure. The latter is advantageously based on the IP protocol and protected against malicious intrusions. In the case of the use of high-frequency PLCs, the information system directly or indirectly controls the PLC concentrators that directly or indirectly serve the receiving points according to the invention. The term "directly serve" means the cases of implementation of the invention where said second means for receiving data are PLC receivers. The term "indirectly serve" means the cases of implementation of the invention where said second means for receiving data are means for receiving information coming from external equipment that contains the radio or PLC receivers. For example when the device according to the invention is connected, via its second means for receiving data, to an electronic smart meter which contains the radio or PLC receiver. It is further provided that the meter used for receiving the data broadcast be an electronic smart meter of gas, water or heat, the invention not being limited to the case of electrical energy meters.

Figure 3:
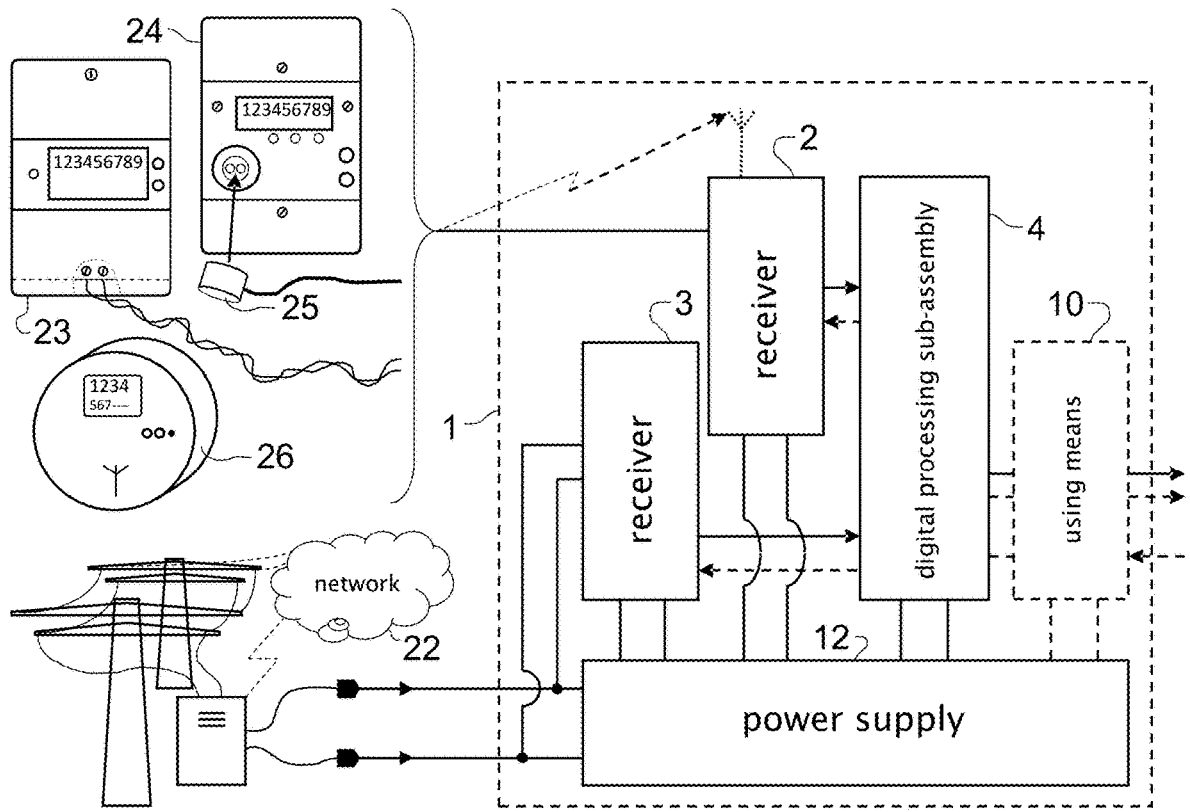
FIG. 3 shows the combination: electronic meter and PLC broadcast.

FIG. 3 shows the combination: electronic meter and PLC broadcast.

This alternative embodiment of the invention is distinguished from the one in FIG. 2 in that the at least one configuration datum is at least partially obtained from an electronic meter to which the device 1 is at least connected one time. The term electronic meter means any meter for example of electrical energy, gas, water, heat, etc. comprising an electronic sub-assembly for facilitating the display and/or the reading of meter indexes and having an information output that can be connected to an external device. This is for example an electronic meter 23 with a wired output referred to as "Customer remote information" as is frequently used in France, a meter 24 with infrared output, provided where applicable with a connection accessory 25, as is frequently used in Germany or a meter 26 with a radio output as is frequently used in the United States of America. Said first hardware and/or software means 2 for receiving so-called configuration data are connected at least one time, in a discontinuous or permanent manner to the meter by a suitable interface to the native or secondary output of the meter. It is indeed provided to simplify the installation of the device by equipping the wire or infrared output meters with an autonomous mini-gateway that retransmits via short-range radio the information output from the meter to a single compatible reception point connected to said first means 2 of the device 1 according to the invention associated with the meter, or directly forming the latter. It is provided for example to use all or part of the serial number of the meter which is often part of the information transmitted by an electronic meter, in order to selectively broadcast the data to the sub-assemblies of the only devices associated with a meter that has an even serial number or, in order to further reduce the size of the sub-assembly of the devices targeted by the broadcast, to take into account only the serial numbers that can be divided by 3 or by 7 etc. The impact of such broadcasts, for example on the total power plan in the applications for managing the electrical network is easy to predetermine. For example by means of a database comprising the full serial numbers of a set of meters, the unit power levels controlled by the intermediary of each one of them and their geographical location where applicable as well as a computer program determining the mathematical formula and/or the combinatorial logic formula to be used on a predetermined dataset in order to achieve a given cumulative power objective. It is provided to use entirely or in part, alone or in logic combination, any digital information coming from the meter and likely to be pertinent for rendering selective the broadcast according to the invention. As such information such as the type of subscription taken out, the intensity or the power subscribed to, the associated rate code, etc. are perfectly able to be used according to the invention in order to render selective the logic broadcast of information received by said second means 3 for receiving data by using all or part of this information as criteria in identity tests between local values and comparable values broadcast received for determining whether broadcast data received should be used or ignored by the receiving device. It is also provided to use the means for adjusting and viewing the meter, which can offer better ergonomics and more possibilities than those of the device according to the invention which in certain simplified alternatives is totally devoid thereof. It is provided that the adjustment or the suitable configuration of the device according to the invention be carried out by a technician at the time of installation of the meter connected to said device. It is also provided to carry out the adjustment or the configuration of the device by anticipation. The technician then carries out the suitable adjusting or configuring of the device according to the invention during the installation or during an intervention on the meter with any device according to the invention not yet installed and connected. The data associated with this prior adjustment is stored in a non-volatile memory of the meter in the framework of its normal operation. As such, possibly a long time after the adjusting or the configuring, if a device according to the invention is connected to the meter, then it automatically benefits from the configuration data transmitted by the data output in the framework of the normal operation of the meter, this without a technician authorized to access the settings of the meter having to physically return to the site.

Figure 4:
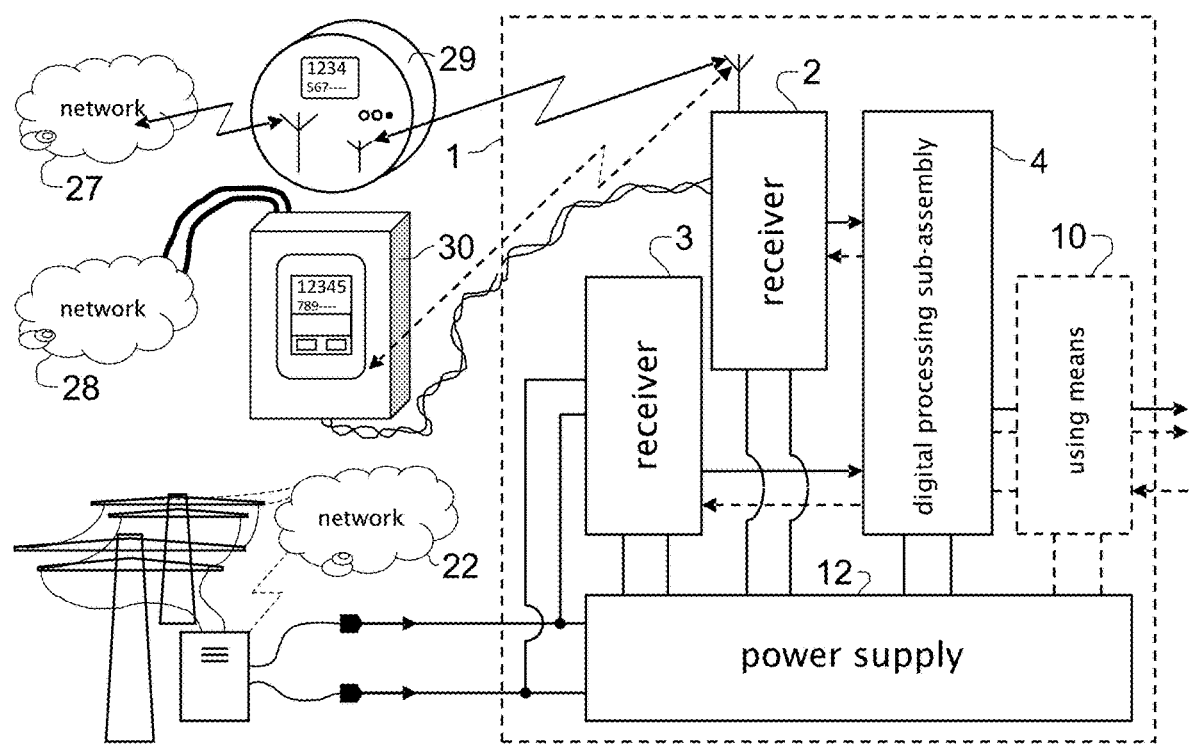
FIG. 4 shows the combination: smart meter and PLC broadcast.

FIG. 4 shows the combination: smart meter and PLC broadcast.

This alternative embodiment of the invention is distinguished from the one in FIG. 3 in that the meter connected to the device 1 is also connected by suitable means, continuously or discontinuously, to a telecommunication network 27, 28 and to the at least one remote information system by the intermediary of one or several interconnected telecommunication networks. It is provided that the infrastructure used for transmitting the data be at least for its terminal portion, exclusively dedicated to the management of a set of meters or that it be shared with other uses. Likewise, it is provided that the telecommunication networks 27, 28, 22 be differentiated, or entirely or partially shared, according to the transmission techniques used and/or according to non-technical constraints such as regulatory, legal or commercial constraints. In the alternatives of FIG. 4, the electronic meter for electricity, gas, water or heat comprises means for establishing a two-way point-to-point data connection with a network infrastructure. This entails most often allowing for remote reading of the meter indexes and in certain cases, also the remote management of the technical characteristics of the supply contract at the point of delivery for a given customer. For example the cutting-off and the re-establishing of the supply, the remote setting of limitations such as the maximum draw intensity, etc. These means for transmitting and for receiving data at a long distance in the framework of a point-to-point connection between an operator or a manager and an identified customer are advantageously able to be used in the framework of the invention for transmitting configuration data to the device 1. This for rendering selective subsequent broadcasts of data to a large number of determined customers. The advantages of the use of a third-party apparatus such as a smart meter in order to act as a telecommunication gateway are numerous. For example, the management of a supply contract that has a sensitive nature from legal, economic, data protection, protection against malicious intrusions, etc. standpoints, the technical means implemented for the data communications with the infrastructure are safe, reliable and most often encrypted. The indirect use of such means in the framework of the invention makes it possible to benefit from a high level of quality in the data transmission without having to implement sophisticated and expensive technical means in the framework of said first means 2. The latter only have to ensure the last local link of the transmission chain which is not very vulnerable and requires only implementing simple and economical technical means. In addition to the information managed naturally by a meter without taking the invention into account such as mentioned in the example of FIG. 3, the connectivity of the meter towards the upstream opens additional possibilities for the implementation of the invention in that the meter acts as a telecom gateway by the intermediary through which an information system can transmit information to the device 1.

FIG. 4 provides a first example of an electronic smart meter 29 that uses a first two-way radio transceiver operating at frequencies authorized for remote reading of meter indexes by a network infrastructure 27. A second short-range radio transceiver compliant with a standard such as "ZigBee", "KNX", "Z-Wave", "Thread", "WiFi", "Bluetooth" etc. is implemented for the transmission of data that can be used locally by the customer. There is also a second example given of an electronic smart meter 30 that uses a two-way PLC transceiver, implementing for example a standard protocol such as "CLP G3", "PRIME" etc. at frequencies authorized for the remote reading of meter indexes, and where applicable for acting remotely on parameters or on actuators linked to the supply contract, by a network infrastructure 28. The meter 30 has an interface for establishing a one-way wired output connection referred to as "Customer remote information" for transmitting data that can be used by a compatible third-party apparatus. The first means (2) for receiving data are in this case an interface able to receive, demodulate and decode the signal transmitted by the wired connection. It is also provided to equip the meter 30 with an optional mini-gateway that allows for the establishing of a short-range radio connection with the device 1 for facilitating the installation of apparatuses, said first means 2 are then a radio receiver compliant with the standard implemented in the gateway such as those mentioned hereinabove in the case of the meter 29.

Figure 5:
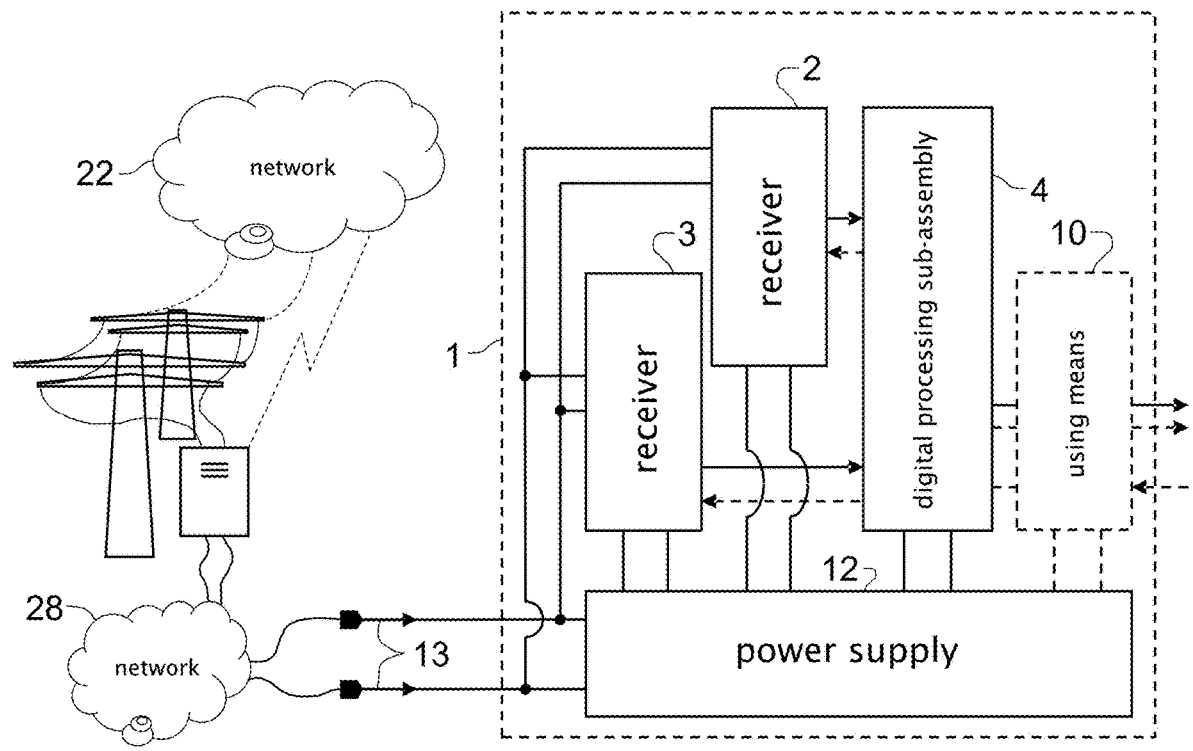
FIG. 5 shows the combination: point-to-point PLC and PLC broadcast.

FIG. 5 shows the combination: point-to-point PLC and PLC broadcast.

In this alternative embodiment of the invention, said first hardware and/or software means 2 for receiving so-called configuration data are a two-way PLC modem and a software sub-assembly called "protocol stack" implementing a communication standard, for example "CLP G3" or "PRIME", said first means being able to receive data in the framework of a point-to-point connection from a suitable network infrastructure 28. This entails for example an infrastructure based on compatible PLC concentrators installed in the vicinity of receiving clusters within receiving range, relayed or direct, according to whether or not the communication protocol is meshed. Said concentrators are connected to the information system providing the management and the monitoring of resources by the intermediary of a cellular telecommunication network of so-called "2.5G" generation or later. As in the example of FIG. 4, said second means 3 are able to receive data broadcast by PLC by means of a suitable network infrastructure 22, of the "low-frequency broad-range" type or of the "high-frequency high-speed" type. Said first and second means for receiving data as well as the low-voltage power supply sub-assembly 12 are connected to the same source of energy 13 which in this example is naturally the electrical network as the latter is also the source of the configuration data and the source of the data broadcast. In a particularly advantageous alternative embodiment, it is provided that said first and second means 2, 3 for receiving data share all or part of the hardware means, even also all or part of the software means implemented for receiving data by PLC in the framework of a point-to-point connection and in the framework of a simultaneous broadcast to a plurality of devices 1. Alternatives are provided wherein the two methods of reception are implemented by two operating methods or two different "profiles" of the same standard, other alternatives run in parallel two separate protocol stacks, with each one being optimized for a method of transmission. For example the protocol stack ensuring the transmissions of data in point-to-point mode, which is not under real-time constraints, uses a modulation that favors bit rate and where applicable implements a meshing that allows each point to relay the data that it receives to other points which are not within the direct range of an upstream transmitter. Inversely, the protocol stack ensuring the simultaneous broadcast of data implements technical options that favor the direct range over the bit rate. Integrated circuits such as the system on a chip "STCOM" from STMicroelectronics (registered trademarks), which comprises a programmable PLC modem functional block, can be configured "on the fly" in order to be able to switch dynamically from operation optimized for point-to-point connections and to a broadcast mode optimized for the simultaneous broadcast of data. Systems on a chip such as for example ATSAM4CP16C from ATMEL (registered trademarks) are able to implement the invention with a single digital integrated circuit comprising said first means 2 for receiving data in the form of a modem functional block in the "PLC G3" standard, said second means 3 for receiving data broadcast in the form of a digital ripple control receiving functional block that uses the integrated analog-to-digital converter and software components for processing the signal executed by the built-in microprocessor associated with the converter, and the at least one digital processing sub-assembly 4 implementing the method according to the invention using the microprocessor associated with the converter and/or the other microprocessor included in this component.

Figure 6:
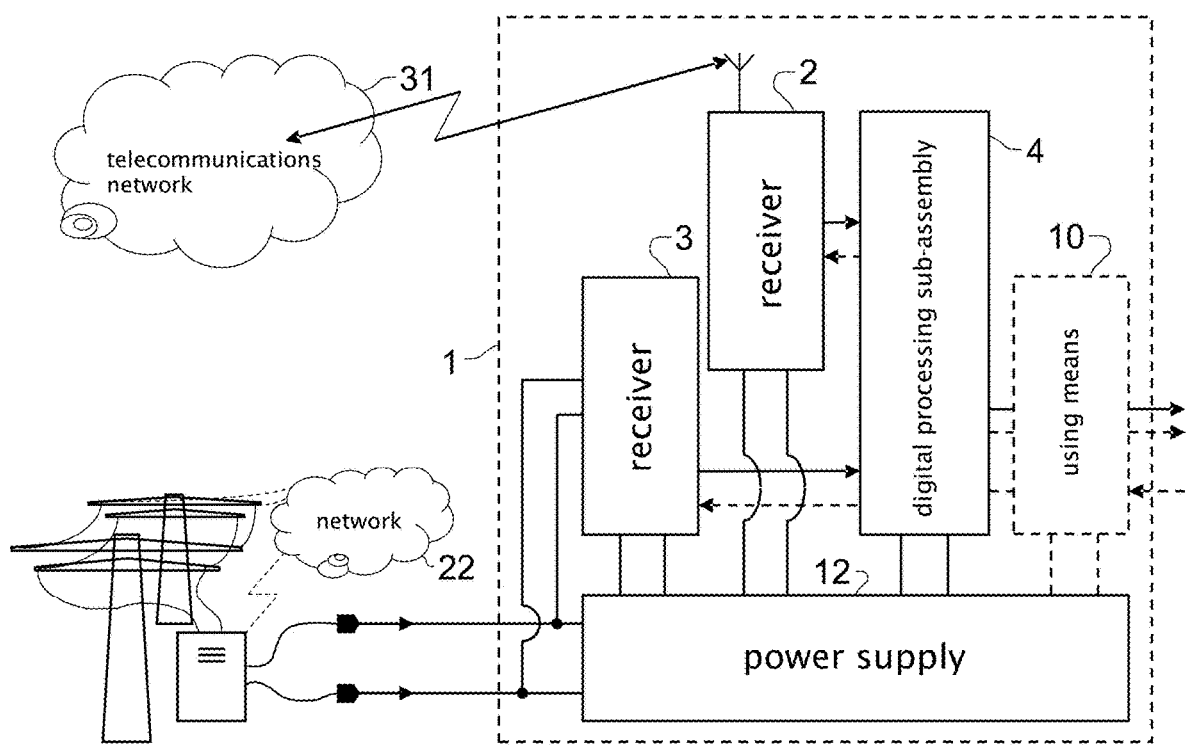
FIG. 6 shows the combination: point-to-point radio and PLC broadcast.

FIG. 6 shows the combination: point-to-point radio and PLC broadcast.

In this alternative embodiment of the invention, said first hardware and/or software means 2 of the device 1 for receiving so-called configuration data are radio frequency means for establishing a point-to-point connection with a telecommunications infrastructure 31, for example a sub-assembly of radio transmission compatible with the "low-power broad-range" NB-IoT and/or Sigfox and/or Lora standards or a modem provided to carry out data transmissions via radio by connecting to a cellular network of the so-called "2.5G" generation or later. As in the example shown in FIG. 5, said second means 3 are able to receive data broadcast by PLC by means of a suitable network infrastructure 22, of the "low-frequency broad-range" type or of the "high-frequency high-speed" type. Systems on a chip such as mentioned hereinabove can easily implement this alternative of the invention with a single low-cost highly-integrated digital integrated circuit. This in particular if the means 3 and 4 are used to implement a digital ripple control receiver.

Figure 7:
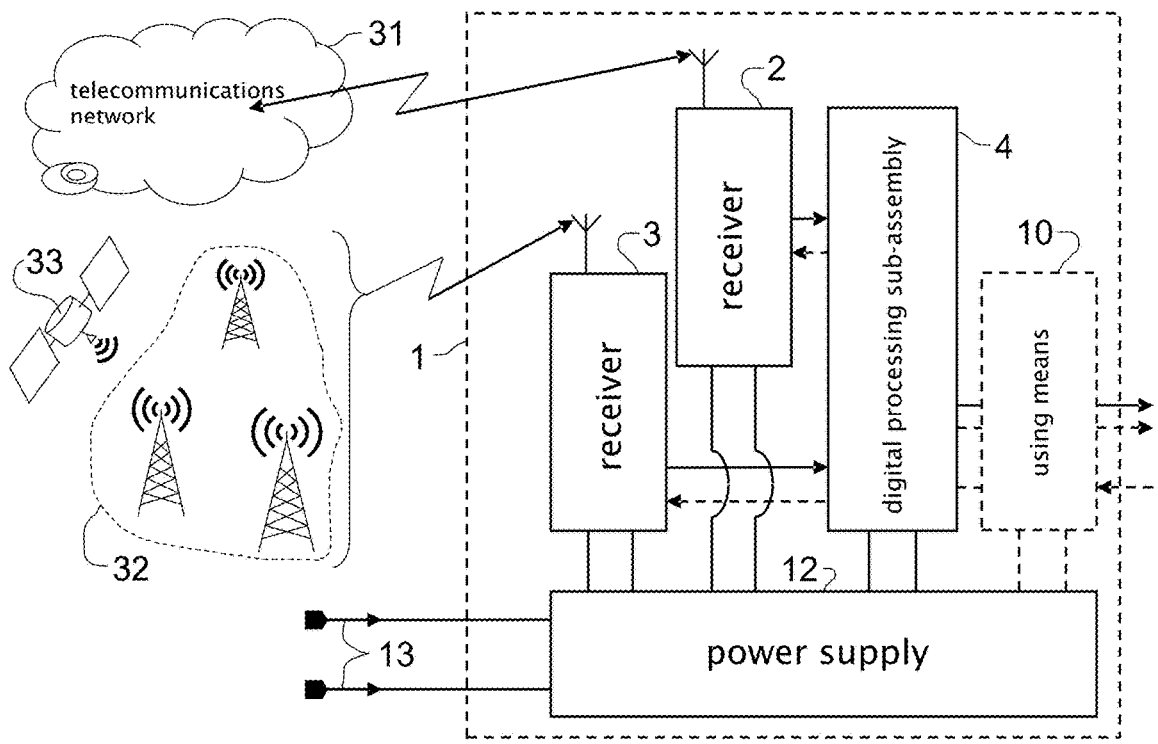
FIG. 7 shows the combination: point-to-point radio and broadcast network.

FIG. 7 shows the combination: point-to-point radio and broadcast network.

This alternative embodiment of the invention differs from that of FIG. 6 in that said second means 3 of the device 1 are able to receive data broadcast by radio by means of a terrestrial 32 or suitable satellite 33 infrastructure.

This entails for example receiving according to the invention data broadcast by using the annexed data broadcast services proposed by terrestrial or satellite broadcast networks of digital radio and/or television. For example satellite broadcast networks of digital radio such as the one from the company "XM Sirius" in the United States of America are particularly suitable in that the means needed to receive and decode the signal broadcast are simple and economical to implement, in addition they require only antennas of small size and they can be placed on-board means of transport. It is also provided to use data transmission services associated with terrestrial or satellite broadcast networks of analog radio and/or television such as for example respectively "RDS" or the "Teletext" in the countries where these mixed digital solutions over analog networks are still in use. This is possible in light of the little bandwidth needed to implement the invention. As this alternative of the invention implements only means of receiving that do not consume much energy, and although it is always possible to use the electrical network as a source of energy 13 of the device 1, it is also provided that the source of energy 13 supplying the sub-assembly supply 12 be a vehicle supply network in on-board uses, a battery in mobile uses, or generators of electrical energy that make use of solar or mechanical energy that can be captured and converted in the environment of the device.

Figure 8:
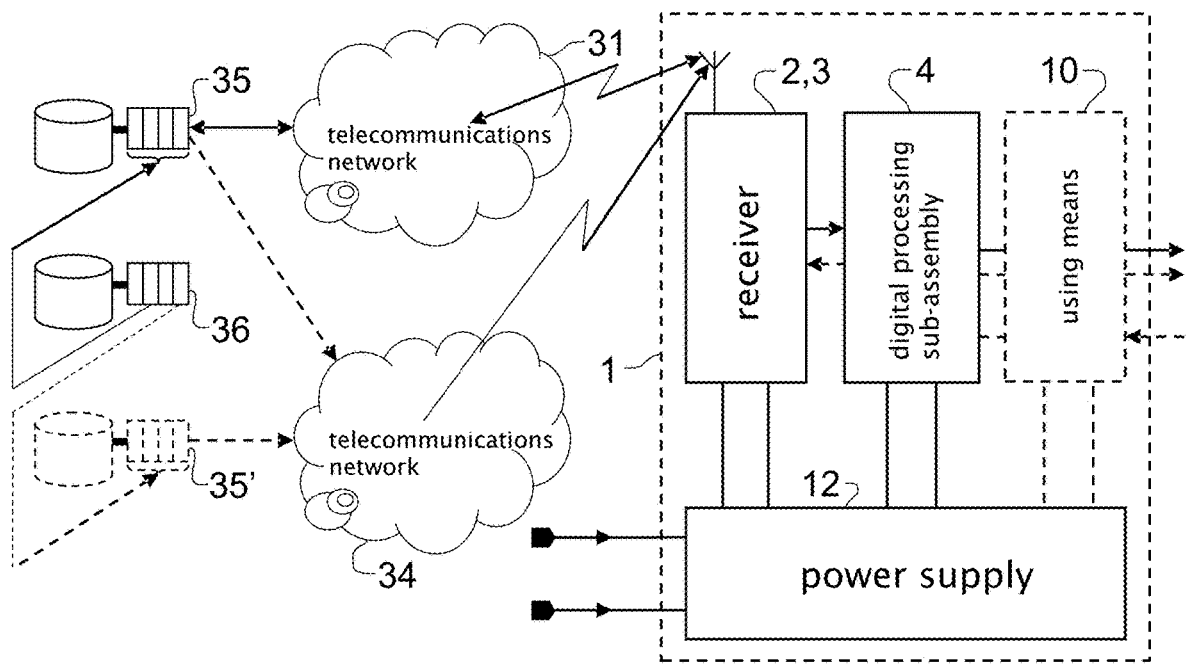
FIG. 8 shows the combination: point-to-point bimodal radio and broadcast.

FIG. 8 shows the combination: point-to-point bimodal radio and broadcast.

This alternative embodiment of the invention implements the same hardware means in the framework of said means for receiving data 2 and 3 of the device 1. The two methods for receiving data, in point-to-point mode and by broadcast, according to the invention being implemented by two operating methods or two different "profiles" of the same digital communication standard by radio, other alternatives running in parallel two separate protocol stacks, with each one being optimized for a method of transmission. This example of implementing the invention applies to two network infrastructures at least partially separated for transmitting data by point-to-point connections and by broadcast. The radio telecommunication networks 31 and 34, respectively used for transmitting the data in point-to-point mode and by broadcast, are controlled by an information system 35, and where applicable 35', this in particular when the two "network" information systems are managed by two different operators. One information system, referred to as "business" 36, which is generally managed by a specialized operator, for example for the operating, management or monitoring of an electrical network, transmits objectives to be achieved to the at least one information system referred to as "network" 35 and/or 35'. A "business" objective is for example an immediate need to erase electrical consumption for a total of 500 KW in a portion of the electrical network. The at least one information system referred to as "network" translates each received "business" objective to be reached into as many data transmissions according to the invention as necessary addressed to the pertinent devices 1 according to the objective to be reached. In this example, each device 1 according to the invention controls the access to the electrical power of one or of several loads of which the unit or total power for a given customer is known in a database of the at least one information system implemented. Systems on a chip such as for example the "subGHz SoC" component developed by the IMEC organization or similar components such as the "SX1272" from SEMTECH (registered trademark) are able to receive the data transmitted by radio according to the two methods of the invention with a single digital integrated circuit integrating the functional blocks 2, 3 of a device 1 according to the invention. The same component being indeed able to receive the data in the framework of a point-to-point radio connection for example according to the NB-IOT, Sigfox, LoRa standards or equivalents, and able to receive data broadcast by radio at the frequencies and at the modulations that are suitable according to the geographical zone of use and able to implement the method according to the invention. A microcontroller or a system on a multiprocessor chip of which the calculating power and the on-board resources depend on the retained protocol stacks and the needs that are proper to the use of the data, forms the digital processing unit 4. Where applicable, means 10 for using the data received supplement the radio transceiver 2, 3 and the processing unit 4 in order to form this alternative of the device 1.

Figure 9:
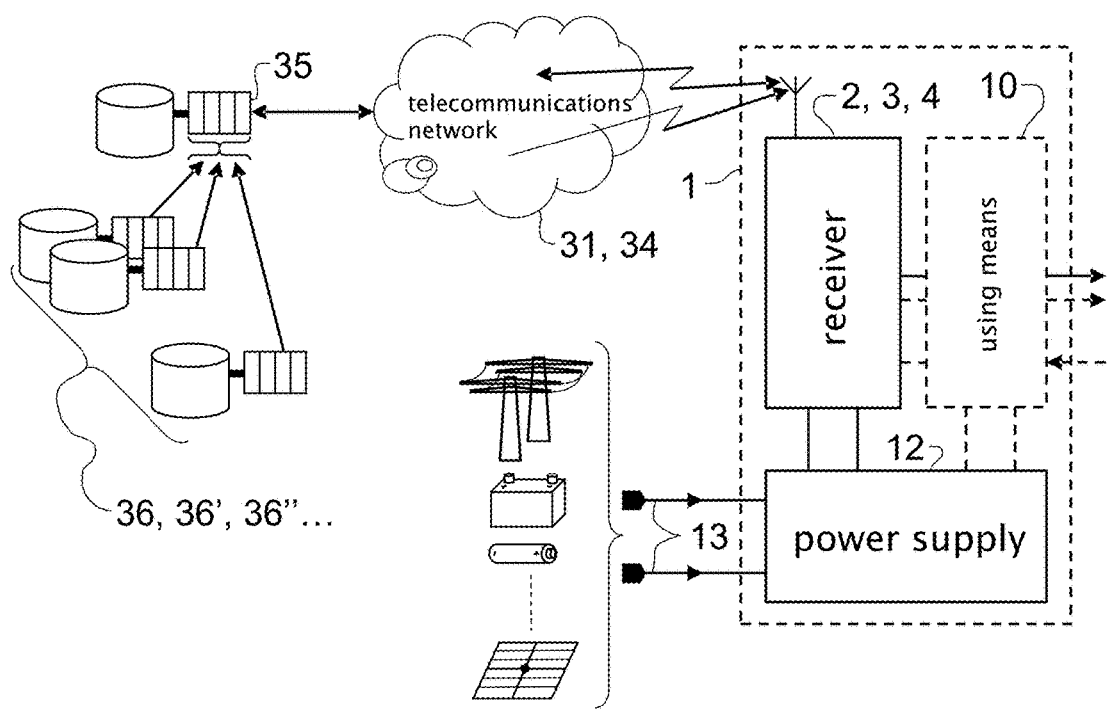
FIG. 9 shows an optimized alternative of the bimodal radio combination.

FIG. 9 shows an optimized alternative of bimodal radio combination.

This alternative embodiment of the invention is distinguished from the one of FIG. 8 in that it is further optimized from the standpoints of compactness, energy consumption and the cost of implementation and the ease of operation. This example of pushed optimization of all of the aspects of a system according to the invention is based on a single network infrastructure for the two methods of transmission that comprise a shared telecommunications network 31, 34, a shared "network" information system 35, 35' managed by a single telecoms operator that offers network services to one or several "business" operators 36, 36', 36" etc. of which the respective specialized information systems transmit objectives to the "network" information system of the telecoms operator. This example for pushed optimization of the implementation of the invention also relates to the devices 1. All of the digital functions and most of the analog front of the shared means for receiving are integrated into a system on a chip comprising the functional blocks 2, 3 and 4 according to the invention. This component is advantageously carried out in a technology with very low electrical consumption in order to be able to supply it if necessary using an autonomous source of energy 13 or energy produced by the environment. Of course a supply by the electrical network remains possible for the applications for the management of the electrical energy that moreover require a connection to the electrical network. It is indeed advantageous to reduce the proper consumptions of the systems and therefore the operating costs thereof, even in the cases where the electrical energy is available in abundance. It is provided in the case of alternative embodiments of the invention where the use of the data requires little or no power, that the functional block 10, even the low-voltage power sub-assembly 12 also be integrated into a single system on a chip.

Systems on a chip of the latest generation such as for example the "subGHz SoC" component developed entirely with CMOS technology including the radio front, by the IMEC organization, and similar commercial components are able to implement the invention entirely by radio with a single digital integrated circuit integrating all of the functional blocks of a device 1 according to the invention. This alternative is particularly suitable for the implementation of communication standards by low-power radio NB-IOT, Sigfox, LoRa or equivalents, and the reception of data broadcast by radio at the suitable frequencies and modulations according to the geographical zone of use, for example where applicable, according to a transmission method or according to a profile dedicated to the broadcast of data in the "LPWA" standards mentioned hereinabove.

Figure 10:
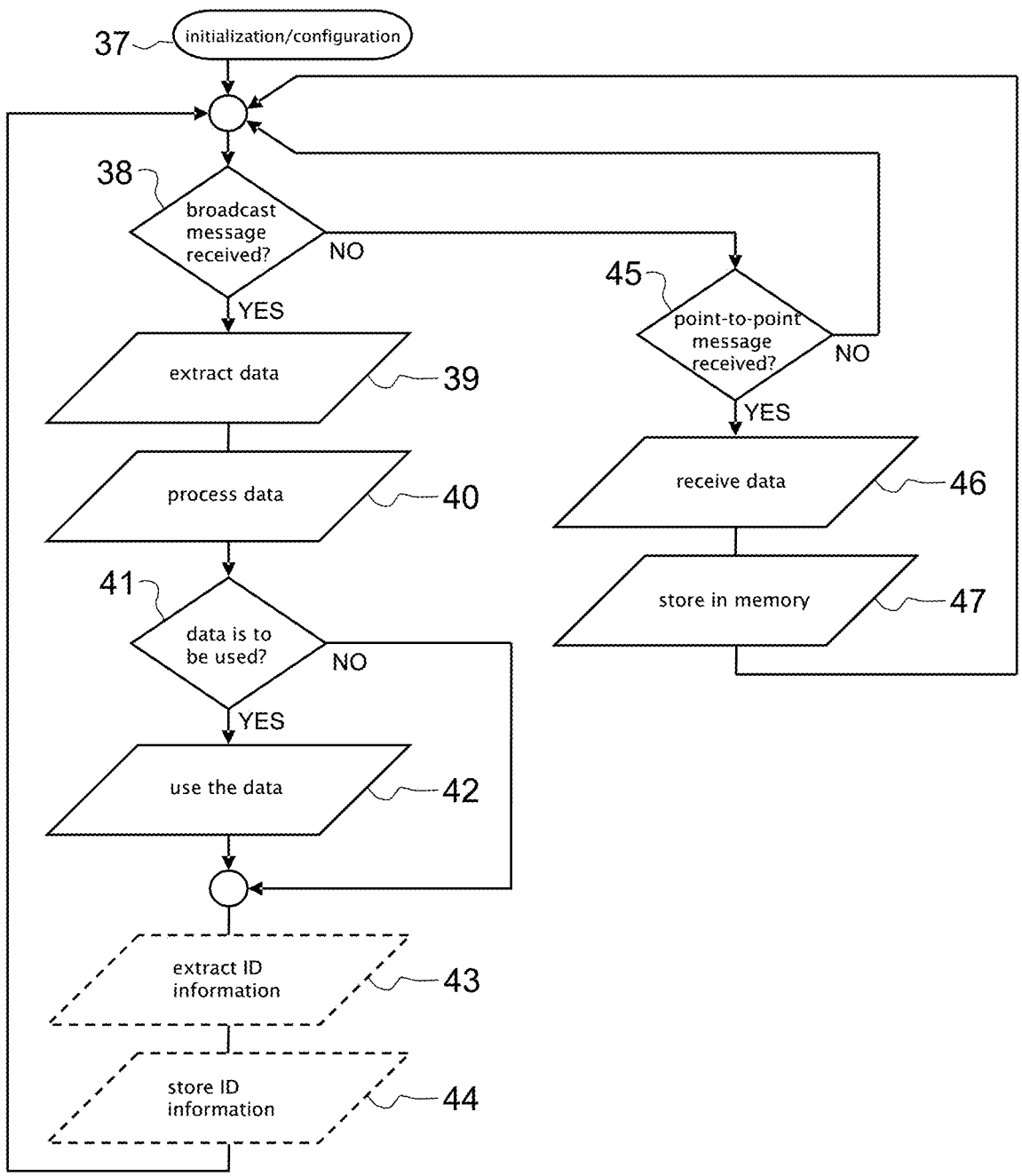
FIG. 10 shows the method of selective receiving of data broadcast.

FIG. 10 shows the method of selective reception of the data broadcast.

This example of implementing the method according to the invention in the form of a programming flow chart begins with the step 37 of initializing variables and of configuring the hardware components of the device. The device is continuously waiting to receive a message by said first means or by said second means for receiving data.

If test 38 has a positive result this means a message broadcast was received by the device. The processing 39 is executed in order to extract the data that determines the selectivity of the broadcast in the data received which is stored in a receiving buffer memory. Then the processing 40 is executed for processing the data extracted in the step 39 in order to determine in the test 41 whether the device should use or ignore the data of an application nature contained in the message broadcast received. The test 41 is carried out on the results of the processing 39 according to the data received which determines the selectivity of the broadcast and of all or part of the at least one configuration datum and/or of the at least one broadcast transmitter identifier having been stored beforehand in the at least one memory of the device. For example, the message broadcast received comprises:

data for encoding an application control associated with the message, for example a control for storing energy, supplemented where applicable by an additional piece of information specifying an objective of a quantity of energy of for example 2 KWh for each user device;

a piece of information determining the selectivity of the broadcast by taking account of at least one configuration datum memorized beforehand to be taken into account in one or several identity tests to be conducted with received data broadcast of the same nature. For example a code meaning that an identity test must be conducted only on the criterion of the group number assigned to each one of the devices, supplemented where applicable by additional information that specifies one or several addressee group numbers, for example the addressee groups 8 or 13 or 15;

The processing 39 calculates whether all of the conditions for using the application data are satisfied or not, i.e. whether the logic state of the combinatorial function resulting from taking account of all of the unit tests required is true or false. The logic state of the resulting combinatorial function is tested in the step 41. In this simple example, all of the devices that physically receive the message broadcast of which the associated group number stored in their memory is 8 or 13 or 15, activate the power load that they control and locally manage the stopping of the storage of energy when the setting of 2 KWh is reached, with this being carried out in the framework of an application program for using the data received 42 of which the content is external to the invention strictly speaking. The invention allows the information system to determine combinations from the simplest to the most sophisticated in order to be able to obtain the selectivity of the broadcast required for reaching a given global objective. For example, the information that determines the selectivity of the broadcast of a control for erasing consumption can be a code that means that an identity test has to be carried out on the criterion of belonging to a given source starting station AND on the criterion of belonging to the category of residential users AND on the category of the use of the electrical heating electricity. Refinements such as the conditions for exclusion are also provided when it is more effective to determine the selectivity sought by applying a logic operator of the negation type on a given criterion so that the devices use by default the application data received except the devices for which the results of the test on the criterion is true. It is provided to use all of the basic logic functions of Boolean algebra, alone or in combination, on all types of criteria including results of numerical calculations, carried out on data memorized beforehand by the device, including broadcast transmitter identifiers where applicable. This is to refine the selectivity of the broadcast according to the invention as much as necessary within the limit of the useful load of data that can be transported in a message. It is also provided to implement the invention by broadcasting a plurality of messages in sequence when the capacity of unitary transport of a message is insufficient for transporting all of the data required for implementing the invention. In this case, it is provided to encode in the message that it is a broadcast in several messages as well as a numbering of the messages so that the devices can reassemble and suitably process the information received in sequence.

If during the test 41 it is determined that the application data received must be used by the device, we exit via the positive branch, and the data of an application nature received in the single message or in multiple messages broadcast is used by the device in the framework of the processing 42 of which the content does not fall within the framework of the invention.

Where applicable, if this refinement of the invention is implemented, whether the device uses or ignores the application data received, the data received in the message that identifies the transmitter, the base station or the antenna that broadcast it, is extracted in the step 43. If necessary, the broadcast transmitter identification data received is processed in order to be made more compact, for example by transforming it by a suitable hash function, it is stored in a memory of the device according to the invention in the step 44. Refinements are provided in order to store the transmitter identifiers only the first time that they are received by the device. It is also provided to take account of the disappearances of transmitters in the infrastructure, which a simple additive memorization in the devices would not allow for. This is done for example by a periodic resetting of the content of the recording memory of the broadcast transmitter identifiers or upon reception of a specific message.

If test 45 has a positive result this means that a message transmitted in the framework of a point-to-point connection has been received by the device. In this case, all or part of the configuration data is extracted from the data received in the step 46 and is stored in a memory of the device in the step 47.

FIG. 11 shows the method of selective broadcasting of the data on an objective. This portion of the method according to the invention is implemented in the information system associated with the telecommunication network providing the selective broadcast of data. After the initializing of this portion of the method in the step 48, the test 49 is continuously executed in order to detect an event that requires a selective broadcast of information in the telecommunication network. Such events are for example the reception of a request transmitted by an associated "business" information system, for example by the information system of an electrical network manager or of an aggregator requiring the urgent erasing, consumption or storage of a cumulated quantity of power or of energy determined at a determined location of the electrical network. The total quantity of power or of energy requiring the aggregation of power or of energy broadcast controlled by a plurality of devices according to the invention to which it entails broadcasting the suitable message for achieving the targeted operational objective, or for getting as close as possible to it within the limits of the resolution of the control of the selectivity of the broadcast of data according to the invention. In case of a positive test outcome of the step 49, one or several processing jobs are carried out in the step 50 in order to determine the broadcast or broadcasts of information to be carried out and the transmitters of the telecommunication network to be used for achieving the targeted operational objective according to the information on the devices according to the invention to whom to broadcast one or several messages and according to information on the transmitters of the telecommunication network. This information is known beforehand by the "network" information system and is stored in at least one database that can be consulted during the at least one processing job of the step 50. The step 50 comprises for example processing jobs for iterative simulation for optimizing the use of the resources of the system according to the invention in order to get as close to the targeted objective as possible. The at least one database is continuously updated by the information system using, for example, configuration information of the devices according to the invention and/or information relative to the technical or non-technical characteristics of the diffuse means controlled by the devices. The technical characteristics are for example unitary electrical power of loads or of generators associated with a given device, the state and/or the residual capacities of the energy storage capacities, etc. The non-technical characteristics are for example the characteristics of a service subscribed to by the individual or entity to which is attached a device according to the invention. Said information on the transmitters of the telecommunication network are for example information linked to the geographical coverage of each transmitter, a transmitter IP address, base station, concentrator or antenna in the network, etc.

The content and the methods of the broadcast of the at least one message which were determined by the information system in the step 50 are followed by the effective broadcast in the step 51 of the at least one message by the suitable transmission means selected by the "network" information system. To this step which terminates the execution of this portion of the method is also provided the resetting of the signaling of the event that had launched the execution to have only a single execution of the processing jobs per event.

FIG. 12 shows the method for updating the network database.

This portion of the method according to the invention is implemented in the devices according to the invention which further comprise means for transmitting data to a remote information system. After the resetting of this portion of the method in the step 52, the test 53 is continuously executed to detect an event that requires the transmission to the "network" information system of at least one configuration datum. Such events are for example the hardware reset of the device according to the invention, a change in the value of a configuration datum, the receiving of a new transmitter identifier, the receiving by said first means or by said second means of a message requiring the transmission of at least one configuration datum. The transmission of at least one message as a response to the triggering event is carried out in the step 54. The means used to transmit the at least one message are for example means for transmitting associated with said first means for receiving data in the framework of a point-to-point connection, with the connection being in this case two-way. In this step which terminates the execution of this portion of the method is also provided the resetting of the signaling of the event that had launched the execution to have only a single execution of the processing jobs per event.

FIG. 13 shows the selectivity according to broadcast transmitters.

This figure shows the implementation of a data broadcast network by radio 55 deployed over a given territory. Note that although FIG. 13 shows a telecommunication or wireless broadcast network, the illustration is also suitable for the broadcast of messages by PLC in a wired network. In this example, the territory covered comprises 3 transmitters 56*a*, 56*b* and 56*c* of which the range makes it possible to broadcast data to all of the devices according to the invention 1*a* to 1*i*. Of course such a small number of devices makes sense only for facilitating the understanding of the invention, the latter is advantageous in relation to the conventional addressing solutions only for simultaneously and selectively addressing large quantities of devices, for example hundreds, even thousands or even more. The distribution of the transmitters depends on constraints such as their physical range in a free space and in the urban environment if it is radio, lobes of antennas, the presence of obstacles to the propagation of waves, the presence of substantial traffic or of sources of noise in the useful frequency band able to reduce the transmission capacities of the network, according to the number and the density of the receivers to be served, etc. If this entails power-line communication, the constraints are for example the topology of the electrical network which materializes the communication space, the presence of loads with a very low impedance weakening the signal or sources of noise that can disturb the communications.

In this example, the transmitter 56*a* covers the territory zone 57*a*, the transmitter 56*b* covers the territory zones 57*b* and 57*c*, and the transmitter 56*c* covers the territory zone 57*c*.

The information system of the network controls the transmitters, advantageously by communications based on IP addresses, in order to activate the transmitters concerned by the achieving of an objective of selectivity in the broadcast of one or of several messages. For example so that each one of the transmitters involved broadcasts in sequence several messages that for example differ only through the transmitter identifier that they contain. Refinements such as repetitions of transmissions within the same sequence, or repetitions of a sequence of unique transmissions are also provided in order to increase the chances that all of the targets devices have received the message. All of the receivers have beforehand received messages broadcast by these transmitters in such a way that they have stored in a memory the transmitter identifiers that they have already received at least one time, and therefore that they are still able to receive.

In the example of FIG. 13, the devices had previously stored their memory the following transmitter identifiers from which they have already received at least one message:

1*a*: ID 56*a*; 1*b*: ID 56*a*; 1*c*: ID 56*a*, ID 56*b*; 1*d*: ID 56*a*, ID 56*b*;

1*e*: ID 56*a*, ID 56*b*, ID 56*c*; 1*f*: ID 56*b*; 1*g*: ID 56*b*; 1*h*: ID 56*b*, ID 56*c*; 1*i*: ID 56*b*, ID 56*c*.

As such for example to broadcast a message of which only the devices 1*a* and 1*b* must use the data, the information system of the network selects the transmitters or the base stations 56*a* and 56*b* to which it broadcasts in sequence a message that contains the data to be used by the target devices and a combinatorial logic function of which the state is calculated by the devices according to the transmitter identifiers that they have memorized beforehand. As such in this example the combinatorial logic function to be broadcast is F=(transmitter identifier 56*a* AND transmitter non-identifier 56*b*). The combinatorial logic function hereinabove is true for the devices 1*a* and 1*b* and false for the devices 1*c*, 1*d*, 1*e*, 1*f*, 1*g*, 1*h* and 1*i*. The objective of the broadcast is achieved. The devices for which this function is true then use the received data broadcast, those for which the function is false reject the received data broadcast. Note that the transmitter identifiers which are not present in the combinatorial logic function received are not the object of a search for the presence in the memory of the device, they are not taken into account for determining the selectivity of the broadcast.

In order to reach a broadcast objective targeting the devices 1*c* and 1*d*, the combinatorial logic function to be broadcast is F=(transmitter identifier 56*a* AND transmitter identifier 56*b* AND transmitter non-identifier 56*c*).

In order to reach a broadcast objective targeting the device 1*e*, the combinatorial logic function to be broadcast is F=(transmitter identifier 56*a* AND transmitter identifier 56*b* AND transmitter identifier 56*c*) etc.

Note that all of the combinations of selectivity are not necessarily possible by using only the transmitter identifiers as the only criteria for taking a decision. It is advantageously provided to combine them with criteria in relation with the use of the data, i.e. by completing a first level of selectivity obtained by means of transmitter identifiers by conditions of identities between data broadcast and configuration data proper to the devices according to the invention which are stored in a memory of the latter. For example the effective selectivity of the broadcast in order to achieve a given objective can be obtained by broadcasting a message that contains the useful data to be received by the targeted devices, a combinatorial logic function leading the devices to carry out tests for the presence or not in memory of given transmitter addresses and identity tests on the data such as a group number, a type of controlled load, a type of service supply contract. It is also provided to carry out logic state tests, or of identity with a transmitted value, on results of calculations made on one or several configuration datum in memory, for example in order to determine whether a unique serial number is a number that can be divided by two or by any other number transmitted in the message etc. Furthermore the invention is particularly well suited for remote controls with a low latency time for large quantities of receivers by communication channels such as radio and PLCs which are able to have one-off unknowns and variations of their zone of coverage over time. Indeed, most of the uses of the invention, in particular for the management of the electrical networks are tolerant in terms of precision and fidelity of the selectivity of the data broadcasts. In other terms, a certain margin of error is allowed in terms of the operational result between the ideal objective of selectivity predetermined by the information system and the objective actually achieved.

Of course, the invention is not limited to the examples that have just been described and many arrangements can be made thereto without leaving the scope of the invention, in particular by combining several alternatives in the framework of the same embodiment, by combining elements taken in several examples in a different manner or by sequencing the steps of the method in a different manner.

The invention claimed is:

1. A device for selectively receiving a data broadcast, to be received simultaneously by a plurality of devices belonging to a predetermined sub-assembly of receiving devices among receiving devices capable of physically receiving data transmitted from a remote information system through a wide-area telecommunication network and/or through a wide-area digital signal broadcast network, the device comprising:

first and second receiving means,
said first receiving means configured to receive at least one configuration datum for limiting an effective reception of application data by said second receiving means, said at least one configuration datum being transmitted by a remote information system through a wide-area telecommunication network in the framework of a point-to-point connection, and
said second receiving means configured to receive a broadcast of data via wide-area radio and/or wide-area power-line communication, transmitted by at least one transmitter belonging to a wide-area telecommunication network infrastructure and/or belonging to a wide-area digital signal broadcast network infrastructure, the data comprising said application data and data determining a selectivity of the broadcast;
at least one digital processing sub-assembly comprising at least one microprocessor, at least one program memory, an interface with said first means, an interface with said second means, and a hardware and/or software interface with means for using all or part of the application data received by said second receiving means;
at least one memory for storing all or part of the at least one configuration datum and/or of at least one broadcast transmitter identifier;
a low-voltage power supply sub-assembly for supplying at least one direct voltage to the device, said supply sub-assembly being supplied by at least one source of energy; and
at least one program, stored in the program memory, that upon execution by the at least one microprocessor causes the at least one microprocessor to operably determine whether all or part of the application data received by said second receiving means is either used or ignored by the device, according to all or part of said data determining the selectivity of the broadcast, and all or part of the at least one configuration datum and/or the at least one broadcast transmitter identifier having been stored beforehand in the at least one memory.

2. The device according to claim 1, wherein:
said first receiving means is one selected from the group consisting of:
a radio modem or a two-way radio transceiver used as a receiver, a radio receiver or a network gateway using radio frequencies in the framework of a wireless local extended, terrestrial, or by satellite telecommunication network, or a power-line communication modem or a power-line communication two-way transceiver used as a receiver, a power-line communication receiver or a network gateway using power-line communication, an interface for connecting a cable an optical fiber, an interface for receiving and demodulating light rays comprising one several wavelengths, an interface for receiving and demodulating a variable magnetic field, and an interface for receiving and demodulating sound signals;
the at least one configuration datum is one selected from the group consisting of:
a group identifier, a source station identifier, an outgoing network identifier of a source station, or a medium-voltage/low-voltage transformer identifier, a geographical sector identifier, or an identifier of the electrical use type, or an apparatus category identifier, or an identifier of a manufacturer and apparatus model and/or of an embedded software version, or a user category identifier, or a building category identifier, or a service operator identifier, and a subscribed service category identifier;
said gateway is one selected from the group consisting of:
a smart meter configured to operate as a telecommunication gateway, a third-party apparatus configured to operate as a telecommunication gateway, and or an access point to an extended network;
said second receiving means is one selected from the group consisting of:
a modem or a two-way transceiver used as a receiver, a receiver a network gateway using radio frequencies in the framework of a wireless terrestrial or satellite telecommunication network, a receiver able to receive data broadcast by terrestrial means by satellite, or a modem or a two-way transceiver used as a receiver, or a receiver or a network gateway using power-line communication, or a ripple control receiver, and a wired or wireless interface for connecting an external sub-assembly for receiving data broadcast by radio or by power-line communication;
the received data broadcasted is one selected from the group consisting of:
a control for turning on or for turning off, a control for assigning a determined value to a parameter, a control for erasing consumption, a control for storing energy, a control for load shedding, a control for load reloading, a control for information transport intended for an application process external to the invention, a zero control that has no effect as a control, and/or information determining the configuration data memorized beforehand to be taken into account in one or several identity tests to be conducted with received data broadcast of the same nature, the expression of a combinatorial function of which the input variables are all or part of the at least one configuration datum and/or all or part of the at least one transmitter identifier, and/or the result of a calculation concerning one or several pieces of configuration data and/or on one or several transmitter identifiers and/or on additional data received and/or stored in a memory of the device, the result of the combinatorial function being a logic state that determines whether the information received is either used or ignored by the device, and/or at least one parameter in line with control data, and/or at least one parameter in line with data determining the selectivity of the broadcast, and/or a broadcast transmitter identifier;
the at least one digital processing sub-assembly is one selected from the group consisting of:
at least one microcontroller, at least one system on a chip, and at least one processing unit available in the form of a printed circuit whereon are mounted components and connectors in order to form a digital processing module that has standardized technical characteristics; and the at least one source of energy is any selected from the group consisting of:
the electrical network, at least one photovoltaic cell, an electrokinetic generator, a battery, and an electrochemical cell.

3. The device according to claim 1, wherein said first and second receiving means are means that are at least partially shared such as to be configured to receive data in the framework of a point-to-point connection, and to receive data broadcast.

4. The device according to claim 1, wherein hardware of said first or second receiving means further comprise said digital processing sub-assembly and/or the at least one memory.

5. The device according to claim 1, wherein said first or second receiving means further comprise means for transmitting data to at least one remote information system.

6. A system for allowing a plurality of devices according to claim 1 for selectively receiving data broadcast in a wide-area telecommunication network and/or in a wide-area digital signal broadcast network, the system comprising:
a first network infrastructure for transmitting data able to be received by said first receiving means of a device;
at least one second network infrastructure, or a second operating method of the first network infrastructure, comprising at least one broadcast transmitter for broadcasting by radio and/or by power-line communication data that can be received by said second receiving means of the devices; and
a first information system for determining at least partially the data to be broadcast by the at least one second network infrastructure or by the second operating method of the first network infrastructure in order to achieve a predetermined operational objective.

7. The system according to claim 6, wherein said first information system furthermore determines at least one configuration datum to be transmitted by the first network infrastructure to devices in the framework of point-to-point connections.

8. The system according to claim 6, further comprising:
at least one second information system, specialized in a field of use and able to transmit to said first information system said predetermined operational objective to be achieved.

9. The system according to claim 6, wherein said operational objective to be achieved has a direct or indirect relationship with a cumulative quantity of power and/or of electrical energy, to be erased or to be consumed or to be stored or to be restored on a predetermined geographical territory and/or in a predetermined portion of an electrical distribution network.

10. The system according to claim 6, wherein said operational objective to be achieved has a direct or indirect relationship with the synchronization of at least one action in a plurality of devices and/or for managing and/or for administering a set of devices.

11. A method for allowing a device according to claim 1 to selectively receive data broadcast in a wide-area telecommunication network and/or in a wide-area digital signal broadcast network, the method comprising steps of:
receiving data broadcast, by said second receiving means;
processing concerning all or part of said received data broadcast and all or part of data that was previously received, from a wide-area network, by said first receiving means and/or by said second receiving means; and determining whether the broadcast data received is either used or ignored by the device according to the result of said processing.

12. The method according to claim 11, further comprising the steps of:
receiving at least one configuration datum by said first receiving means from a wide-area network in the framework of a point-to-point connection; and
writing in the at least one memory of the device all or part of the at least one configuration datum received.

13. The method according to claim 11 further comprising the steps of:
extracting a broadcast transmitter identifier in the received data broadcast; and
writing in the at least one memory of the device of a one-to-one identifier of the broadcast transmitter.

14. The method according to claim 11, further comprising:
a step of transmitting by the device to a remote information system, at least one configuration datum and/or at least one one-to-one identifier of a broadcast transmitted of which the device receives the messages, on the occasion of a trigger event.

15. The method according to claim 11, further comprising the steps of:
taking account by an information system of an operational objective to be achieved by the selective broadcast of at least one message;
elaborating by said information system of the content of the at least one message to be broadcast, according to the action to be accomplished by the devices that use the received data broadcast and the selectivity of the broadcast required to achieve the operational objective, all or part of said content being elaborated using data stored in at least one database to which said information system has at least read access; and
broadcasting at least one message in the network by at least one broadcast transmitter selected by the information system in order to determine a first level of selectivity of the broadcast based on controlling the coverage of the at least one selected transmitter.

16. The method according to claim 15, further comprising:
a step of taking account by said information system of feedback on the effect obtained by the selective broadcast of the at least one message for repeating the steps with a new operational objective aiming to cancel the difference between the objective effect and the obtained effect, or until said difference is considered as being negligible.

17. The method according to claim 11, wherein the method is performed in order to balance the production and the consumption of electricity in an electrical network, and/or in order to protect its integrity, by acting remotely downwards or upwards on the consumption of a plurality of diffuse power loads controlled directly or indirectly by the devices.

18. The method according to claim 11, wherein the method is performed in order to synchronize one or several actions involving a plurality of the devices.

19. A method for allowing a device according to claim 2 to selectively receive data broadcast in a wide-area telecommunication network and/or in a wide-area digital signal broadcast network, the method comprising steps of:
receiving data broadcast, by said second receiving means;
processing concerning all or part of said received data broadcast and all or part of data that was previously received, from a wide-area network, by said first receiving means and/or by said receiving second means; and determining whether the broadcast data received is either used or ignored by the device according to the result of said processing.

20. A method for allowing a device according to claim 3 to selectively receive data broadcast in a wide-area telecommunication network and/or in a wide-area digital signal broadcast network, the method comprising steps of:

receiving data broadcast, by said second receiving means;

processing concerning all or part of said received data broadcast and all or part of data that was previously received from a wide-area network by said first receiving means and/or by said second receiving means; and determining whether the broadcast data received is either used or ignored by the device according to the result of said processing.

* * * * *